United States Patent [19]

Stytz et al.

[11] Patent Number: 5,201,035
[45] Date of Patent: Apr. 6, 1993

[54] DYNAMIC ALGORITHM SELECTION FOR VOLUME RENDERING, ISOCONTOUR AND BODY EXTRACTION WITHIN A MULTIPLE-INSTRUCTION, MULTIPLE-DATA MULTIPROCESSOR

[75] Inventors: Martin R. Stytz, Fairborn, Ohio; Ophir Frieder, Basking Ridge, N.J.

[73] Assignee: The United States of America as represented by the Secretary of the Air Force, Washington, D.C.

[21] Appl. No.: 549,870

[22] Filed: Jul. 9, 1990

[51] Int. Cl.$^5$ .............................................. G06F 3/14
[52] U.S. Cl. .................... 395/163; 395/124; 395/121; 395/119; 395/133
[58] Field of Search ............... 395/163, 119, 124, 133, 395/121

[56] References Cited

U.S. PATENT DOCUMENTS

| | | | |
|---|---|---|---|
| 4,475,104 | 10/1984 | Shen | 395/163 |
| 4,594,673 | 6/1986 | Holly | 395/121 |
| 4,685,070 | 7/1987 | Flinchbaugh | 364/522 |
| 4,697,178 | 9/1987 | Heckel | 340/729 |
| 4,821,210 | 4/1989 | Rumbaugh | 364/518 |
| 4,835,712 | 5/1989 | Drebin et al. | 395/124 |
| 4,882,679 | 11/1989 | Tuy et al. | 364/413.22 |
| 4,914,589 | 4/1990 | Crawford | 395/124 |

OTHER PUBLICATIONS

Back-to-Front Display of Voxel-Based Objects, IEEE CG & A University of Michigan (Gideon Frieder) U. of Cin. (Dan Gordon) Univ. Birh (Reynolds) 1985.
A Dynamic Screen Technique for Shaded Graphics Display of Slice-Represented Objects, 0734-1894/87 R. anthonyreynolds Rec-Mar. 21, 1985 Acc-Jun. 19, 1986.
Fast Method for 3D Display of Medical Objects, Ph.D. Dissertation Dept. of Comp. & Info., Richard A Reynolds, May 1985, 257 pp.

Primary Examiner—Dale M. Shaw
Assistant Examiner—Kee M. Tung
Attorney, Agent, or Firm—Bernard E. Franz; Donald J. Singer

[57] ABSTRACT

This is a methodology which reduces the time required to render a volume with extracted isocontours and inserted cutting plane and perform an arbitrary rotation within a three-dimensional volume. The volume is first partitioned among the processors of a multiple-instruction, multiple-data (MIMD) multiprocessor computer. As the user indicates the isocontour to be extracted, rotation, and cutting plane to be inserted into the image space volume, each processor independently selects the optimum algorithm for rendering the volume using the indicated display parameters on its local data set. If the processor is fully behind the cutting plane, a front-to-back (FTB) volume rendering algorithm is used. If the cutting plane lies behind the cutover point, then a back-to-front (BTF) volume rendering algorithm is used, otherwise the FTB volume rendering algorithm is used.

14 Claims, 8 Drawing Sheets

SYSTEM OPERATION OVERVIEW

Components of the Recursive Hidden - Surface Removal Definition.

Adaptive Recursive BTF Hidden-Surface Removal Algorithm Image Space Geometry.

Processed Volume Savings Realized Using the Adaptive Recursive BTF Hidden-Surface Removal Algorithm

Image SpaceCoordinate Generation with the Adaptive FTB Algorithm

Scene Rendering with the Adaptive FTB Algorithm

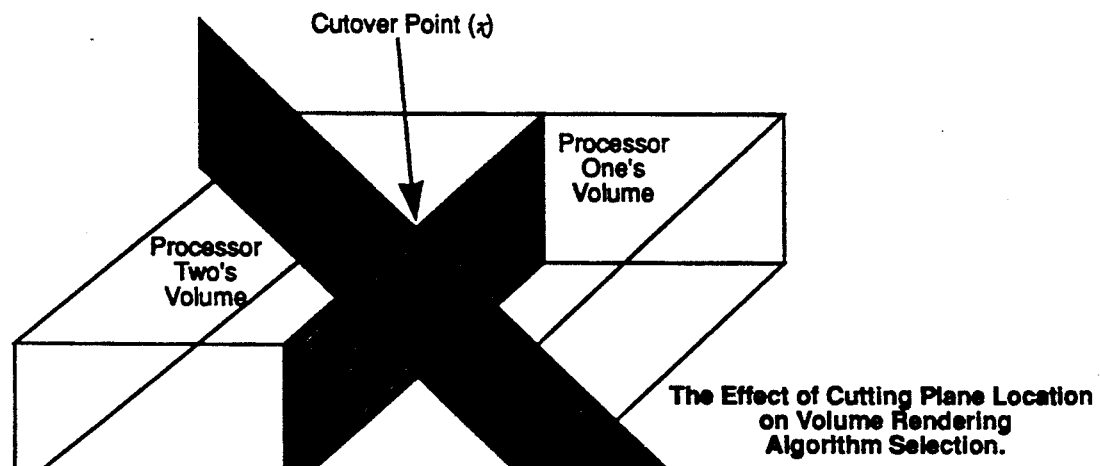
Fig. 6 The Effect of Cutting Plane Location on Volume Rendering Algorithm Selection.
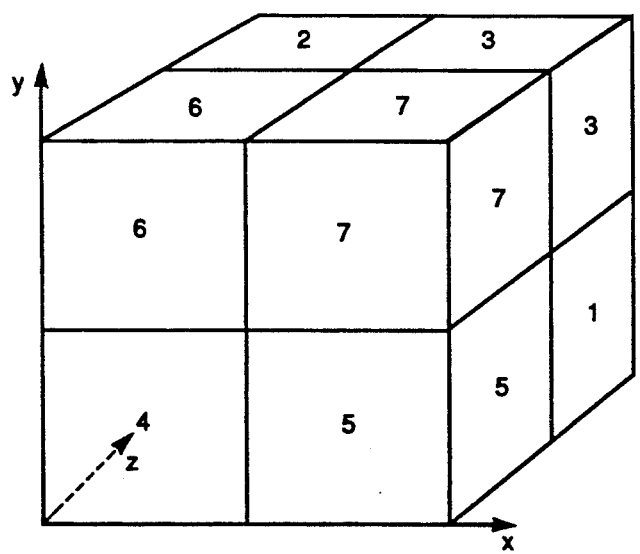
Fig. 7 Octant Numbering Scheme.
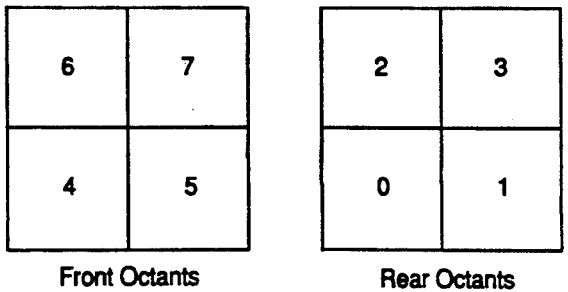

DYNAMIC ALGORITHM SELECTION FOR VOLUME RENDERING, ISOCONTOUR AND BODY EXTRACTION WITHIN A MULTIPLE-INSTRUCTION, MULTIPLE-DATA MULTIPROCESSOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to dynamic algorithm selection to accomplish volume rendering along with isocontour and body extraction within a multiple-instruction, multiple-data multiprocessor.

Previous techniques for accomplishing volume rendering within a 3D volume require complete examination of the volumes in order to perform a correct volume rendering. This technique imposes a great computational workload, and there was a need for reducing this workload.

United States patents of interest which relate to imaging systems for three-dimensional displays include U.S. Pat. No. 4,882,679, to Tuy et al, U.S. Pat. No. 4,821,210, to Rumbaugh, U.S. Pat. No. 4,697,178, to Heckel, and U.S. Pat. No. 4,685,070, to Flinchbaugh.

In particular, the Tuv et al patent describes a system for three-dimensional diagnostic imaging, in which a plurality of slice images of a specimen are generated. A region of interest is selected from within a slice, and is extrapolated to subsequent slices. A boundary, indicative of a surface of interest, is selected from within the region of interest. A viewing surface is defined in relation to a generated surface image which was selected from the boundary. A scaling means assigns a scaled gray level to the three-dimensional image. Image information is selectively modified by the data from the original slice images to add surface density visualization. Means is also provided to facilitate selective segmentation of a three-dimensional image along a plane or planes of interest.

The Rumbaugh patent relates to a system and method for the fast display of three-dimensional images. A plurality of volumetric cells containing three-dimensional image information are scanned onto a two-dimensional viewplane. The cells are organized to conjointly represent a volume by arranging them contiguous to each other and forming a plurality of parallel, planar arrays. The cells are sequentially displayed by planar arrays starting with the array most distant from the viewplane and proceeding to the array closest to the viewplane. Within each displayed array, the cells are displayed in back-to-front order by rows starting with the row most distant from the viewplane and proceeding to the row closest to the viewplane. Within each row, the cells are displayed in order of decreasing distance from the viewplane. Finally, the polygonal surfaces within the cells are displayed.

The Heckel patent describes a computer graphics system for real time calculation and display of the perspective view of three-dimensional scenes. Hidden lines and surfaces are removed from the display at high speed in a hardware raster processor which uses a scan line depth buffer algorithm. The algorithm minimizes computation time by utilizing a line segment analysis of the scene to be displayed in which only the depth information for each pixel within each line segment within each line to be scanned is compared with depth information of the corresponding pixel in a depth buffer (z-buffer). The display information and depth information of each pixel is stored in the depth buffer only when the depth information of the pixel being compared with the corresponding depth information in the depth buffer lies closer to the view reference plane. The storage of display information of only pixels closer to the view reference plane than the stored display information minimizes time-consuming storage of information and the amount of memory required.

The Flinchbaugh patent relates to a system for displaying and interactively examining a three-dimensional volume. A computer system is utilized to display in two dimensions a representation of a three-dimensional volume, which is a tessellation of cells represented as three-dimensional units. The three-dimensional volume is represented by a plurality of digital numbers, and a designator determines which of the digital numbers are to be represented in the two-dimensional display. Each digital number is represented by one cell, and represents a color which indicates a parameter such as amplitude. Each corresponding cell is colored in accordance with the digital number. A cursor may be used to indicate which of the three-dimensional volume representations is to be excavated. The designator is thereby changed, and the excavated cells are stripped away, exposing the immediately adjacent cells.

Other publications of interest include:

Frieder, G.; Gordan, D.; and Reynolds, R. A. "Back-to-Front Display of Voxel-Based Objects," IEEE Computer Graphics and Applications, vol. 5, no. 1, pp. 52–60, January, 1985.

Reynolds, Richard A. "Fast Methods for 3D Display of Medical Objects", Ph.D. Dissertation, Dept. of Computer and Information Science, University of Pennsylvania, May, 1985, 257 pp.

Reynolds, R. Anthony; Gordan, Dan; and Chen, Lih-Shyang, "A Dynamic Screen Technique for Shaded Graphics Display of Slice-Represented Objects, Computer Vision, Graphics, and Image Processing", vol. 38, no. 3, pp. 275–298, June, 1987.

SUMMARY OF THE INVENTION

An objective of the invention is to provide for reduction in the computational requirement for detection and rendering of 3D volumes in a multiple-instruction, multiple-data multiprocessor computing environment.

The invention relates to a methodology which reduces the time required to anti-alias, extract isocontours, and render a volume of interest, within a three-dimensional volume. The volume is first partitioned among the processors of a multiple-instruction, multiple-data (MIMD) multiprocessor computer. As the user indicates the isocontour to be extracted and cutting plane location within the image space volume, each processor independently selects the optimum algorithm for rendering the portion of the volume represented by its local data set.

The invention's uniqueness lies in its capability for rapidly forming three-dimensional displays, using a multiprocessor computer in which each processor independently selects the optimum algorithm for rendering the volume from a suite of algorithms, based upon the desired cutting plane location and isocontour to be displayed.

The invention reduces the amount of computation required to be performed in order to extract and render a portion of a 3D volume. This allows for rapid viewing of the data and faster examination of the volume for desired characteristics. The invention incorporates new features for adaptive termination of algorithms based upon the amount of information that is added to the image through further processing and a new technique for deciding which algorithm is optimal for each MIMD processor for extraction of the body. The algorithm selection technique makes its choice based upon the data stored at the processor and the body to be extracted.

This imaging system may also be used for the detection, extraction, and rendering of isocontours within a multiprocessing environment. Examples of possible uses include detection of submarines in the ocean, extraction of individual organs for display within a medical image, isolation of areas of constant temperature, pressure, moisture, wind velocity, and/or turbulence within Earth-based weather and planetary atmosphere data, extraction of volumes with constant temperature, pressure, and/or moisture within data describing these characteristics inside man-made structures, and isolation of volumes containing oil deposits and/or drilling bore holes within oil field reservoir maps.

BRIEF DESCRIPTION OF THE DRAWINGS

FIG. 6 is a diagram showing the effect of cutting plane location on Volume Rendering Algorithm selection;

FIG. 7 is a diagram showing the octant numbering scheme;

APPENDICES

Figure 1:
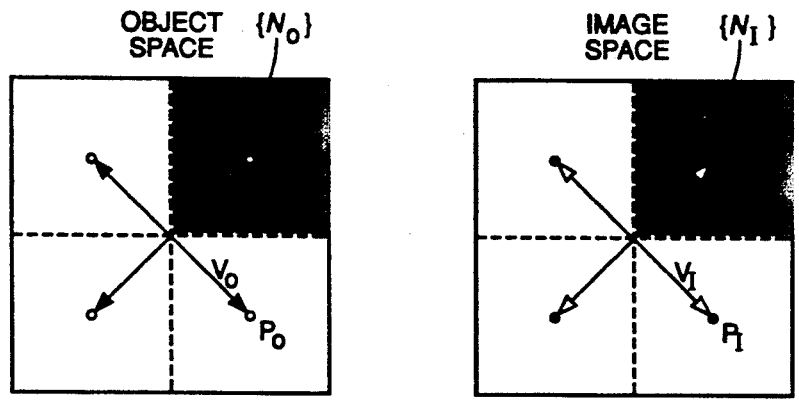
FIG. 1 is a diagram showing components of the Recursive Volume Rendering Notation Definition.

The invention is disclosed in a Dissertation Thesis by Martin Robert Stytz, titled "Three-Dimensional Medical Image Analysis Using Local Dynamic Algorithm Selection on a Multiple-Instruction, Multiple-Data Architecture", Dept. of Electrical Engineering and Computer Science, University of Michigan, Oct. 30, 1989; which is hereby incorporated by reference and made a part hereof as though fully set forth. Appendices H and J of the thesis are included herein before the claims.

The invention is also disclosed in a paper submitted to IEEE Transactions in Medical Imaging by M. R. Stytz and O. Frieder, titled "Dynamic Adaptive Hidden-Surface Removal for Medical Image Volume Rendering"; a paper submitted to the Third IEEE Symposium on Computer-Based Medical Systems by O. Frieder and M. R. Stytz titled "Dynamic Detection of Hidden-Surfaces Using a MIMD Multiprocessor"; and a paper by M. R. Stytz and O. Frieder, titled "Experience Using a Dynamic Adaptive Hidden-Surface Removal Algorithm for Volume Rendering Within a MIMD Architecture". These papers are included herewith as appendices and are made a part hereof as though fully set forth.

DETAILED DESCRIPTION

1. Introduction.

The following terms are used in the description of the invention. A voxel is a volumetric cell, and these cells are organized into an array depicting the desired property information in each cell. BTF means back-to-front. FTB means front-to-back. HSR stands for hidden-surface removal; which may be considered more clearly as a reference to volume rendering, which is a process for extracting and displaying the visible portion of a 3D data set. Object space, also called the scene, is a 3D cubical volume. For the algorithms discussed here, the dimension, N, of object space within each processor must be a power of two, $m=\log_2(N)$. Object space is represented within the computer by a three-dimensional array of size $N \times N \times N$. Image space is the three-dimensional (3D) space wherein the final image is displayed. The image space coordinate values generated by the image processing algorithms are mapped into a two-dimensional (2D) discrete space coordinate system for representation of the image by a 2D array called the image output buffer. The voxel data model is the assumed data model in the following discussion as it minimizes the packing/unpacking overhead incurred in the processing of the images (note that this does not preclude any compression of data for retention purposes). Data elements are the array values which occupy the object space array, the content of an array position is determined by the value of the corresponding voxel.

The operation of the algorithms as described below includes anti-aliasing capability as well as isocontour extraction, cutting plane insertion, and volume rendering. The anti-aliasing capability can be omitted from processing without affecting the operation of the algorithms, with the only noticeable change being a reduction in run-time and a decrease in image quality.

Section two defines recursive volume rendering (referred to as hidden-surface removal (HSR)) algorithms. Section three presents a discussion of the performance of the medical imaging pipeline. Section four describes the adaptive recursive BTF volume rendering (HSR) algorithm and section five describes the adaptive recursive FTB volume rendering (HSR) algorithm. Section six describes the dynamic volume rendering (hidden-surface removal, etc.) process.

2. Recursive Volume Rendering Algorithms Defined.

The operation of a recursive volume rendering algorithm is dependent upon the use of recursive coordinate composition. Recursive coordinate composition relies upon the use of a basis set of vectors within a space and the ordered application of scaling/summing operations to the vectors to generate all the coordinate values within the space. The other component of the recursive hidden-surface removal technique is the use of back-to-front, or front-to-back, image space processing to insure that only the voxels visible from the desired orientation are contained in the rendered image. The back-to-front approach requires that image space processing begin at the rearmost voxel in image space, and that successive voxel values are written to screen space in the image space back-to-front order. The front-to-back technique, on the other hand, begins processing at the foremost image space voxel and allows voxel values to be written to a given screen space location only if no voxel value has been previously written to the location. For both techniques, the rendered image contains only the density values of the voxels visible from the given orientation.

For both the back-to-front and front-to-back algorithms, a critical decision is the selection of technique for computing the foremost (rearmost) image space voxel and then moving forward (rearward) in image space in an ordered manner. A recursive back-to-front (front-to-back) volume rendering algorithm uses recursive coordinate composition to locate the rearmost (foremost) voxel and impose the required processing sequence in image space. Having made this choice, the same technique is also used in object space so that movement through both spaces can proceed in parallel. As the object space coordinates are generated, they are mapped in a 3D array wherein the voxel values are stored. These voxel values are then written into the 2D screen space array at the u, v coordinates given by the x',y' image space coordinates. The z' image space coordinate value is retained for shading and distance comparison in front-to-back processing. Note that in order for this technique to work correctly, the object space vector corresponding to each image space vector must be known.

The decision to use recursive coordinate composition imposes the twin restrictions that object space and image space be cubical and a power of two in dimension and that a basis set of vectors for both spaces is available. The first restriction can be met by a combination of modality slice interpolation and/or padding of the 3D object space array with data from void slices. The second restriction is satisfied by insuring that the set of vectors used is a superset of the orthogonal vector set for each space. A choice for the vector set is the set of vectors defined by the lines connecting the center of the scene and the voxel at the center of each octant.

The class of recursive back-to-front volume rendering algorithms is defined using partitions of object and image space and a set of operations on these spaces. To hold the initial data set and the resulting image, two arrays are employed, a 3D object space array and a 2D image space array, each of dimension such that for each point in object space and image space there is an array element. The object space partitions are defined using a set of the neighborhoods of points in object space, $\{N_O\}$, such that each neighborhood is a regular shape and the set of neighborhoods completely tessellates object space. The set of $\{N_O\}$s form object space, with each $\{N_O\}$ being an object space array. One of the simplest shapes with which to tessellate a 3D space is a cube, which both we and Frieder et al (see Background section, 1985 paper) employ to define the neighborhoods. The use of a cube partitions object (and image) space into octants. The components of the recursive hidden-surface removal definition are illustrated in 2D space in FIG. 1.

To generate the set of points in each $\{N_O\}$, a set of basis vectors and a starting location for the generation of the set are required for each neighborhood. These requirements are met as follows. For each $\{N_O\}$, select a point $P_o$ at the center of $\{N_O\}$, and define the vector $V_o$ as the vector aligned from the origin to the point $P_o$. This selection process generates the set $\{P_O\}$ of points and the set $\{V_O\}$ of vectors in object space. While $\{V_O\}$ is not a basis set, the choice of a cube as the basic tessellation element guarantees that $\{V_O\}$ contains a basis set. To generate all the points in object space, determine a relation R, such that all the points in $\{N_O\}$ can be computed by applying R to $\{P_O\}$ and $\{V_O\}$. The vector set and generation points required for image space are computed by applying the rotation matrices, M, to each of the points in $\{P_O\}$, i.e., $P_o \times M \rightarrow P_I$, resulting in the image space coordinates for the set of points in $\{P_O\}$. This new set of points, $\{P_I\}$, and its associated vector set $\{V_I\}$, are used to generate the set of points $\{N_I\}$ which result when $\{N_I\}$ is rotated into image space. Determine the BTF $\{N_I\}$ generation sequence for $\{P_I\}$ by sorting the subset of points in the scene contained in $\{P_I\}$ in order of decreasing distance from the observer. Starting with the point in $\{P_O\}$ furthest from the observer, and with its corresponding point in $\{P_O\}$, apply the relation R to $\{P_I\}$ and $\{P_O\}$ in synchrony, thereby computing $\{N_O\}$ as well as the image space coordinates $\{N_I\}$. Whenever R yields a single point in $\{N_I\}$ and $\{N_O\}$, project the data element from the identified position in the object space array, $\{N_O\}$, to its new location in the image space array $\{N_I\}$. When R has been applied to all points in $\{P_O\}$ and $\{P_I\}$, thereby rotating the whole of object space into image space, the contents of the image space array contain the desired view of object space with all hidden surfaces removed.

The class of recursive front-to-back algorithms is defined using the same object and image space partitions and operations as employed to define recursive back-to-front algorithms. There are two noteworthy differences. First, the FTB sequence for processing the points in $\{P_I\}$ is determined by sorting $\{P_I\}$ in order of increasing distance from the observer. Second, once R has produced a single point in $\{N_I\}$ and $\{N_O\}$ and it has been Projected from the object space array to its new location in the image space array, no other point in $\{N_O\}$ is allowed to project to the identified screen space location. Incorporation of these differences into the definition of the class of recursive BTF algorithms presented above results in a definition for the class of recursive front-to-back algorithms.

A simple R is obtained if $\{P_I\}$ and $\{P_O\}$ are composed of the voxels at the center of each neighborhood. The vector set $\{V_I\}$ then contains the vectors which have a common endpoint at the origin for the volume and with their other endpoint fixed at one of the points in $\{P_I\}$. $\{V_O\}$ is defined similarly. Since the vectors are in 3-space, each vector of $\{V_I\}$ and $\{V_O\}$ is defined by its three components, $V_x$, $V_y$, $V_z$, with each component lying along its associated major axis. Note that if $V_x$, $V_y$, and $V_z$ are scaled by the same amount, then the direction of the vector is preserved and only its length is changed, and that this relationship holds for any scaling factor as long as the same scaling factor is applied to all three components. R is therefore defined as a recursive scaling operation on $\{V_I\}$ and $\{V_O\}$ which forms the vector sets $\{V_I^*\}$ and $\{V_O^*\}$ by halving the length of each of the components of the vectors in the given vector sets and then uses these vectors to compute eight points which lie within eight discrete partitions, $\{N_O^*\}$ and $\{N_I^*\}$, of the $\{N_O\}$ and $\{N_I\}$ respectively (Since the original set of $\{N_O\}$ and $\{N_I\}$ are octants, the $\{N_O^*\}$ and $\{N_I^*\}$ are referred to as suboctants. In general, the $\{N_O^*\}$ at a level l of the recursion are suboctants of a single object space octant at level l-1, with the same relationship applying in image space). These new points, the $\{V_I\}$, and $\{V_O\}$ are passed to the next deeper level of recursion, where eight new partitions of each of the $\{N_O^*\}$ and $\{N_I^*\}$ are generated. Note that this formulation produces the set of coordinates at sub-cube octant 3 and not the sub-cube center at recursion level m-1. This mis-positioning can be corrected by adjusting each of the coordinates generated at level m-1 by applying R twice to $\{V_I\}$ at the m-1 level and then subtracting the resultant vector from each coordinate set at level m-1 before the set is sent to level m.

R, as defined above, can be used to accomplish volume rendering and scene rotation for a volume of size $N \times N \times N$, where $N=2^m$, as follows. Order the elements of $\{V_I\}$ in BTF order. Recursively apply R to each $\{V_I\}$ for each element of $\{P_I\}$ in BTF order and simultaneously to the corresponding $\{V_O\}$ and $\{P_O\}$, generating the $\{V_I^*\}$, $\{P_I^*\}$, $\{V_O^*\}$, and $\{P_O^*\}$. Continue the recursion in a like manner until its depth equals m. At the deepest level of recursion, R provides the mapping from an object space coordinate to its location in image space. Therefore, at the deepest level of recursion, copy the value in the object space array location identified by the object space coordinates to the image space array entry identified by the image space coordinates.

3. The Adaptive Recursive Back-To-Front Volume Rendering Algorithm.

For the BTF volume rendering algorithm, a cease processing determination is made using a distance test strategy. To generate a 3D image, the algorithm must process all voxels intersecting or lying behind the cutting plane, the remaining voxels can be safely ignored. By using this test, the adaptive BTF algorithm processes an object space octant or suboctant only if the cutting plane lies within or in front of the octant's or suboctant's corresponding image space octant. This test permits the algorithm to terminate operation when all of the octants behind/intersecting the cutting plane have been transformed from the object space to image space. This strategy prevents processors from examining those octants, suboctants and voxels which lie in front of the cutting plane, leading to a computational saving.

The adaptive BTF hidden-surface removal algorithm uses the vector sets $\{V_O\}$ and $\{V_I\}$, and a three-dimensional object space $N \times N \times N$, where $N=2^m$. The z'-value for each voxel location in image space is generated and can be stored for later use by shading hardware/software. Define i of the scene ij to represent subcoctant j within octant i, and so on. In image space, let C represent the center of the scene, $C_i$ represent the $P_I$ for octant i, and $C_{ij}$ represent $P_I$ of suboctant ij. $D_{rp}(x)$ returns the distance in image space from the back-to-front reference plane to the point x, $D_p(x)$ returns the distance in image space between the point x and the scene's cutting plane and $D_o$ returns the distance from $P_o$ to the furthest point within the suboctant (Letting L be the length of a side of a scene octant, the distance can be computed using the formula: $D_o = [(L > (\text{recursion—level}-1))^2 * 3]^{\frac{1}{2}}$ where $>$ is defined as the left shift operator and $L=N/2$ for the SCC case and N/4 for the FLL case).

Figure 2:
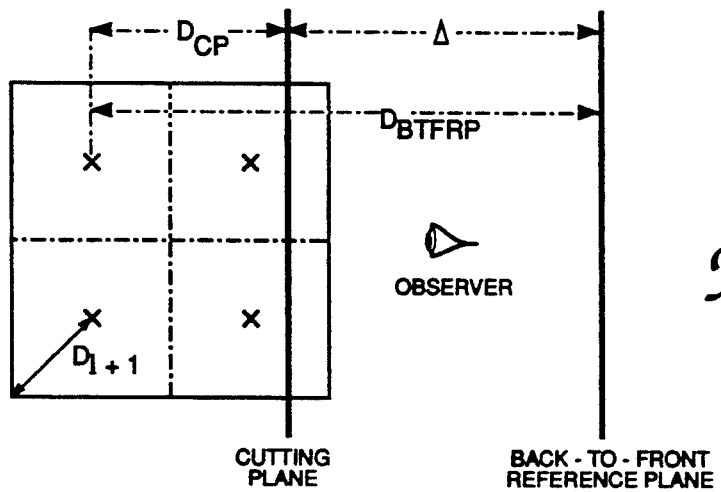
FIG. 2 is a diagram showing the Adaptive Recursive Volume Rendering algorithm image space geometry.

The volume is first rotated to the desired orientation, and a cutting plane (CP) is inserted into the image space volume such that the plane is parallel to the x'-y' plane. The back-to-front reference plane (BTFRP) is defined by $Ax+By+Cz-\Delta=0$ such that $\Delta$ is much greater than N and lies behind the observer. This definition places the BTFRP parallel to the cutting plane in image space. Using a BTFRP provides the capability to determine if an octant (or suboctant) lies closer to the BTFRP (and hence the observer) than does the cutting plane. This calculation is performed because if an octant or suboctant lies closer to BTFRP than the cutting plane, and the cutting plane does not intersect the octant or suboctant, the octant or suboctant cannot contribute to the final scene and so needs not be examined. The geometry of these distance tests, which are described next, is portrayed in 2D in FIG. 2, which shows the Adaptive Recursive BTF Hidden-Surface Removal Algorithm Image Space Geometry.

Having established the rotation of the scene, cutting plane position, and BTFRP position, the coordinates for the successively smaller octant centers in image space and object space are generated in BTF order. The difference in operation between the adaptive recursive HSR algorithm and the basic recursive HSR algorithm occurs when the new coordinates for a suboctant are generated. For each new set of suboctant coordinates, the position of the suboctant relative to the cutting plane is determined, with the results of this test determining if the object space to image space transformation is performed. The test requires first determining the distance from the suboctant center to the cutting plane, $D_{CP}=D_p(C_i)$ and the distance from the suboctant center to the BTFRP, $D_{BTRRP}=D_{rp}(C_i)$. If $D_{CP}>D_o(C_i)$ and $D_{BTRRP}<\Delta$, do not process the corresponding object and image space suboctant because the image space suboctant lies closer to the BTFRP than the cutting plane and the cutting plane does not lie within the bounds of the octant. If either condition fails, process the suboctant because either the cutting plane lies within the suboctant or the suboctant is further from the BTFRP than the cutting plane.

Continuing in the same manner, treat parent octant i as though it were the entire scene and determine the visibility of its eight octants. If the recursion level equals m-1, use $\{R\}$ and the appropriate coordinate adjustments to generate the individual image space and object space voxel coordinates in back-to-front order and store the image data in the image space array. Otherwise, use $\{R\}$ to compute $C_{ij}$ for the next recursion level and then determine which of the octants ij are visible to the observer. Compute the required distances, the distance from the suboctant center to the cutting plane, $D_{CP}=D_p(C_i)$, and the distance from the suboctant center to the BTFRP, $D_{BTRRP}=D_{rp}(C_i)$. If $D_{CP}>D_o(C_{ij})$ and $D_{BTRRP}<\Delta$ then do not process the remainder of ij. If either test fails, consider ij to be a parent octant and continue with the BTF volume rendering process, and the associated distance determination steps, for each of the new suboctants ijk. Continue processing the successively smaller suboctants and applying the distance tests until the entire volume is examined. The potential savings for this algorithm is illustrated in 2D in FIG. 3, where the octants the adaptive BTF HSR algorithm avoids examining are shaded.

4. The Adaptive Recursive Front-To-Back HSR/Volume Rendering Algorithm.

A difference between BTF and FTB algorithms is that a FTB algorithm checks each image space array location for a value before writing to the location. Therefore, because the FTB algorithm processes from the front of image space, it generates information concerning the location of the screen space coordinates remaining to be written. This information can be used to direct image rendering efforts and to adaptively terminate processing. The critical change required to implement an adaptive recursive FTB algorithm is employing a record keeping mechanism which both guides image processing operations and detects the processing termination point.

An adaptively terminating FTB volume rendering algorithm can stop processing when its output buffer is full, therefore a suitable record keeping mechanism is a data structure which keeps track of unwritten points in screen space.

The adaptive recursive front-to-back hidden-surface removal or volume rendering algorithm operates on an $N \times N \times N$ ($N = 2^m$) voxel object space and a $2N \times 2N \times 2N$ voxel image space to allow for supersampling. The vector sets $\{V_O\}$ and $\{V_I\}$, the generation points $\{P_O\}$ and $\{P_I\}$, and R are defined identically to those in the basic recursive FTB algorithm. As in the basic recursive FTB volume rendering algorithm, the image space z-value for each image space point is generated and can be stored along with the density value obtained from the object space array for later use by shading hardware/software.

Consider the image space generation process as a three step process. The first step generates the image space voxel coordinates of each voxel in object space. The second step places the object space voxel density value into the image space voxel value, thereby gradually populating image space with voxel values. The third step, begun once image space is completely populated by transformed voxels, performs the image space to screen space transformation. This last transformation consists of a voxel-by-voxel search for the image space voxel with smallest z' value which meets the user volume rendering criteria for each screen space coordinate.

In a recursive algorithm, the image-space-to-screen-space transformation is extremely simple because screen space u and v coordinates correspond to image space x' and y' coordinates. This correspondence allows the image space search to be finessed by locating the first (or in the case of a BTF algorithm, the last voxel to be transformed to image space from object space) object space voxel meeting the user's selection criteria which is transformed to a given space x', y' coordinate and then placing the value for this voxel at the matching screen space u, v coordinate. In this manner, the image is gradually built up. For the basic FTB algorithm, all object space voxels are transformed through image space into screen space, but only the first transformation to each pixel appears in the final image. The remaining volume rendering computations are wasted. This perspective provides a guide to forming an adaptively terminating recursive FTB algorithm by performing the entire space coordinate generation step first, and then stopping processing when the image is complete in screen space. The crucial insight is devising a method which allows the algorithm to determine when the image is complete. In broad terms, the strategy is to find the total number of the pixels which are lit when performing the image space coordinate generation step (since $x',y'=u,v$) and then to use this information to terminate processing when the total number of pixels lit during the image-space-to-screen-space transformation equals the total computed during image space coordinate generation.

First, assume that all of the voxels which will be transformed into image space in the volume rendering phase meet the user's voxel selection criteria. Then, generate the $\{N_I\}$ which results from the FTB application of $\{R\}$ to the $\{P_I\}$ and $\{V_I\}$ established by the user's scene orientation criteria. As each voxel coordinate in image space is generated, determine if the screen space pixel at the x'y' coordinates has been lit. If it is lit, do nothing. If it is not lit, increment the total number of screen pixels to be lit by one. When this step concludes, the total number of pixels required to be lit to correctly render the image is in hand. Then, when performing adaptive recursive FTB volume rendering, stop processing when the total number of object space voxels transformed into image space and then written to screen space equals the previously computed total number of pixels to be lit. Simply stated, the algorithm requires one $\{N_I\}$ generation to determine the number of pixels to be lit, then a synchronized $\{N_I\}$ and $\{N_O\}$ generation, which stops when the total number of pixels lit equals the total number required to be lit.

There are three criteria for the data structure employed for adaptive termination. First, the record keeping structure must maintain a record of which screen space pixels must be filled by the algorithm. Second, the structure must guide the search in image space for acceptable voxels, because the use of thresholding, and the normal operation of the imaging modalities, creates holes in screen space which must be filled in by object space voxels lying ever deeper in image space. Third, the data structure must capture the image space coordinate generation steps.

To guide the operation of the adaptive FTB algorithm, and to serve as a record keeping device, an oct-tree is used. This data structure was chosen because it mirrors the $\{N_I\}$ decomposition in image space, therefore the coordinate values for the successively smaller partitions of $\{N_I\}$ need only be computed when determining the contribution of each suboctant to the final image. During image rendering, the branches of the oct-tree can be followed to retrace the image space processing steps already performed. The number of pixels predicted to be lit by a given suboctant as well as whether the suboctant has been transformed can be recorded within the corresponding oct-tree node. The octants which are predicted to have voxels which light screen space pixels can then be transformed first. If holes remain in the image, the remaining octants behind the transformed octant are operated upon. By retaining a pixel count and node transformation status at each oct-tree node, the algorithm can move through object-/image space so that it does not transform octants lying in front of a cutting plane and only transforms those octants behind the cutting plane to fill in holes in the image, thereby realizing the other two criteria described above. The operation of the adaptive FTB HSR/volume rendering algorithm is sketched below.

First, an oct-tree is formed to retain the FTB image space coordinate generation sequence and the image space coordinates required to generate the individual image space voxel coordinate values. The initial operation of the algorithm requires one complete $\{N_I\}$ generation to predict the number of pixels to be lit by each octant and suboctant of the oct-tree and to record the image space coordinate generation sequence in the oct-tree. When all of the children of an image space branch have been processed, the total number of image space points to be written by the octant represented by the branch is computed from the sums stored in its child nodes and stored in the branch node. To simplify the recursion, the total number of screen space coordinates to be generated by the oct-tree is copied from the root node of the oct-tree and placed in a global variable. The diagram in FIG. 4 illustrates this step.

Figure 4:
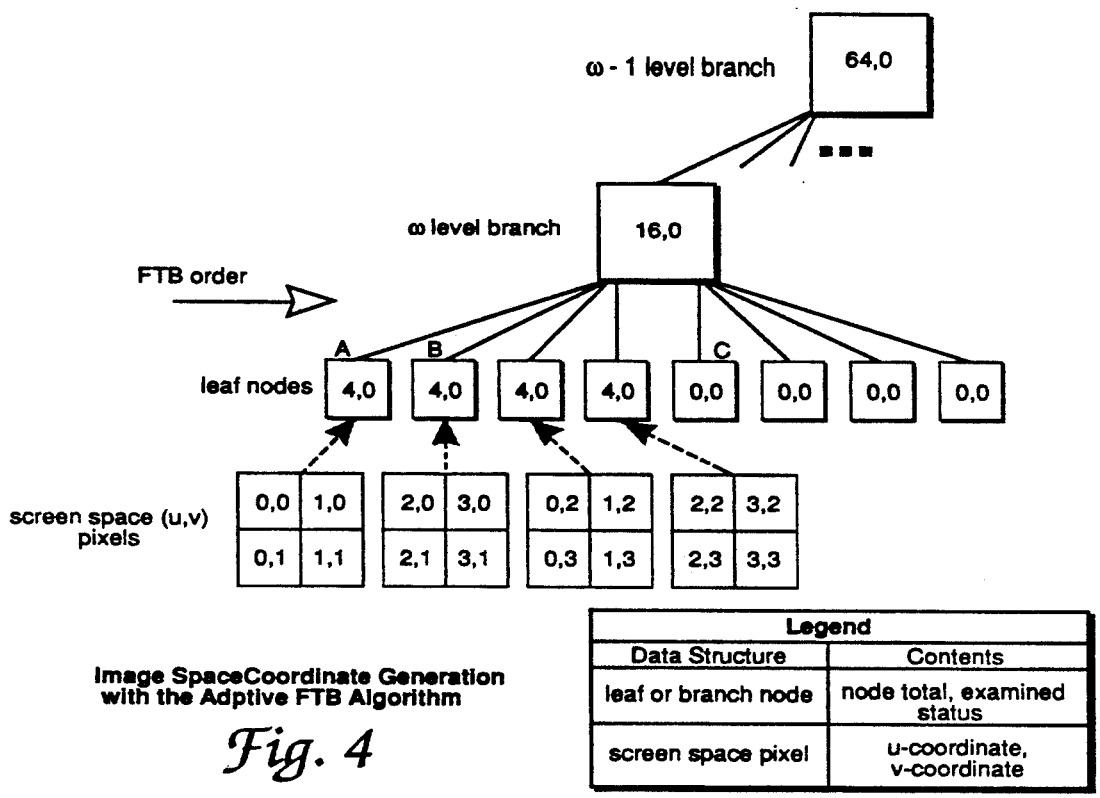
FIG. 4 is a diagram showing image space coordinate generation with the Adaptive Front-to-Back Volume Rendering Algorithm.

FIG. 4 shows the status of the eight leaves of an $\omega$-level (lowest level) branch after the $\{N_I\}$ for each leaf has been processed by the adaptive FTB algorithm. The processing for the leaves has two parts. The first part calculates the coordinates of each leaf and retains these values within the node for later use in rendering the image. The second portion of the processing determines the screen space pixels which each leaf is predicted to light, and this number is stored within the leaf as the node total. For example, in FIG. 4, the leaves marked A and B are both predicted to light four pixels, and the leaf marked C is predicted to light none. In addition, each leaf has been marked as unexamined (this flag is used later in the image rendering phase) by setting the examined status flag for each leaf to zero. Since image space is processed in FTB order, only the leaf octants lying at the front of image space are predicted to light any pixels during image rendering, rear octants show a node total of zero indicating that they are completely obscured and cannot contribute information to the final image unless screen space holes remain after processing the foremost octants. The processing at the branches of the oct-tree consists of maintaining a running total of the number of pixels predicted to be lit by all its leaves. Again referring to FIG. 4, the $\omega$-level branch has a node total of 16, indicating that its child leaves are predicted to light 16 pixels, and the $\omega$-1 level branch has a node total of 64, indicating that the leaves from its child branches are predicted to light 64 pixels.

Once the initial $\{N_I\}$ generation is complete, volume rendering is performed by recursively moving through $\{N_I\}$ and $\{N_O\}$, using the oct-tree to generate the image space coordinates in $\{N_I\}$. If an image space octant or suboctant is totally obscured it has a node total value of zero, indicating that its associated object space octant or suboctant need not be transformed into image space when rendering the image. Therefore, the initial pass over the leaves of the lowest-level ($\omega$) branch only examines leaves with a total greater than zero. Whenever an object space point is transformed into image space and thence to screen space, the total at the leaf is decremented by one, the total at the parent of the leaf is decremented by one and the global total is decremented by one. As soon as all eight voxels represented by an oct-tree leaf have been processed, leaf processing stops and the next leaf in FTB order is processed. Whenever an image space oct-tree leaf is tested for transformation, this fact is recorded by setting the examined status flag to one so that the node is never tested nor transformed again.

After the leaves for the $\omega$-level branch with an initial node total > zero are transformed, the image is tested for screen space holes. At the lowest level, $\omega$, in the image space oct-tree, the existence of holes is demonstrated by the $\omega$ level branch having a node total value >0 when the last of its leaves that had an initial node total value > zero have been transformed. If a hole remains, then octants corresponding to the un-projected oct-tree leaves lying further back in image space are projected into screen space through image space after being populated by object space. When the total at the $\omega$ level branch equals zero, the object-space-to-image-space transformation process for this node stops, and the algorithm proceeds on to process the leaf nodes of another $\omega$ level branch. This phase of the operation is depicted in FIG. 5, which shows the oct-tree from FIG. 4 at a point during the image rendering operation.

Figure 5:
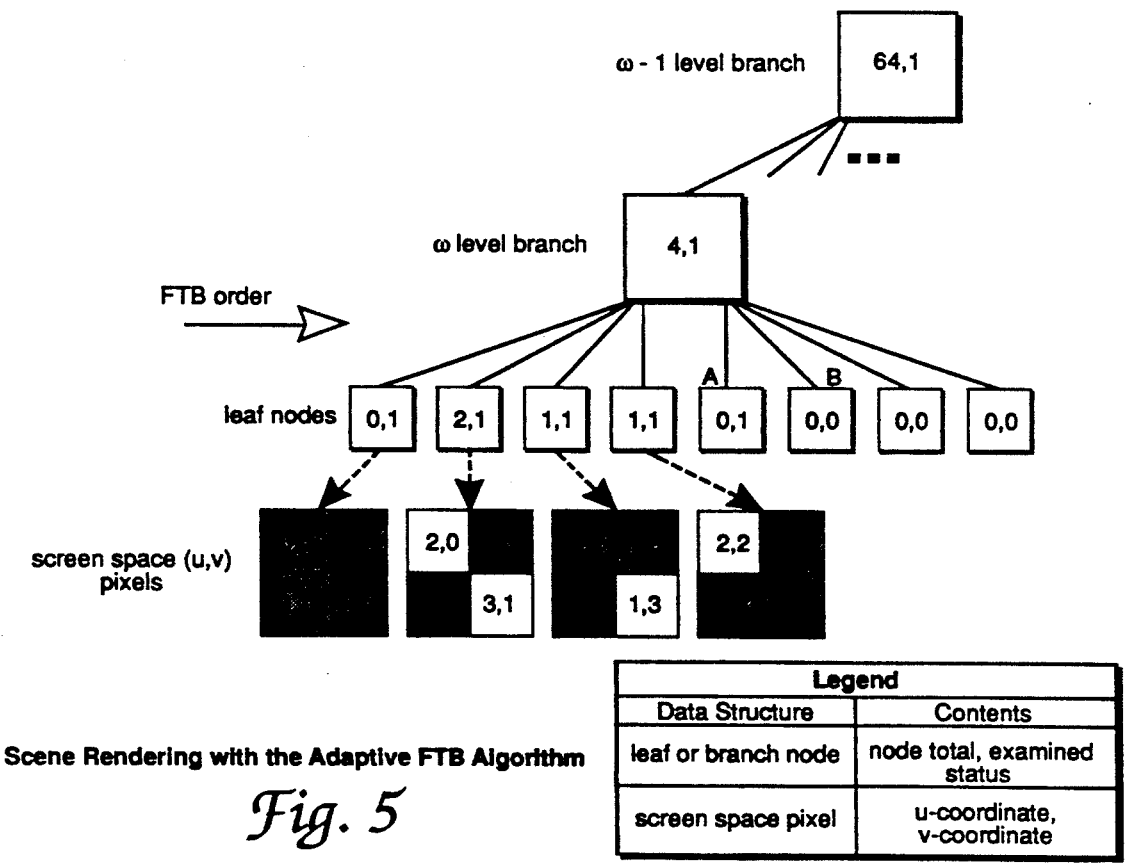
FIG. 5 is a diagram illustrating scene rendering processing with the Adaptive Front-to-Back Volume Rendering Algorithm.

FIG. 5 depicts the processing status after the first five leaves of the $\omega$-level branch have been examined. The first leaf lit all four of the pixels it was predicted to light, so its total is zero and its examination status is 1, indicating that the image space volume represented by the node was examined. The second leaf only lit two pixels, so its total is two, but because its volume has been projected to screen space its examination status is also 1. The other two leaves predicted to light pixels were also not completely successful, as indicated by their totals. Since the $\omega$-level branch total is greater than zero after the initial pass over all the leaves expected to light pixels is completed, the remaining leaves belonging to the branch are examined in FTB order. In the diagram, node A has already been examined, but since the $\omega$-level branch's total is unchanged the leaf lit no pixels. The leaf at B is the next leaf to be examined.

If a broader search for qualified image space voxels is required, the node total at higher level branches is >0. In this case, the octant transformation process cannot be terminated when the total at an upper-level branch drops to zero. Instead, the algorithm must undertake a broader examination for pixels which can be lit, and the entire image space octant belonging to the branch must be re-examined. Termination of octant re-examination is permitted only when the global total number of pixels remaining to be lit reaches zero. This requirement, in effect, calls for a complete search of object space for all suitable voxels which transform into the image space octant and can be mapped into any pixel in screen space. At this point, the record keeping concerning the leaves and branches which were already inspected becomes important. The examination status records allow the octant-wide search to concentrate on the octants in image space lying behind the cutting plane which were originally by-passed since only the by-passed octants can contribute to the final image. Because only the suboctants which can contribute to the final image are projected during this broader search, and as over 80% of the computation occurs in the leaves and lowest level branches, a reduction in rendering time is realized.

5. Dynamic Adaptive Volume Rendering.

By combining the adaptive BTF and adaptive FTB volume rendering algorithms to take advantage of the consistently low rendering time provided by the FTB algorithm for high threshold window saturation ($\sigma$) values or when the cutting plane is at the front of image space and of the decreased rendering time obtained by the adaptive BTF algorithm on low $\sigma$ values and when the cutting plane in near the back of image space a performance improvement is attained. This new scene-processing strategy improves individual processor performance and reduces total rendering time by having each processor in the multiprocessor image rendering machine independently and dynamically select, for each user input, the best performing adaptive recursive HSR/volume rendering algorithm. Algorithm selection is based on the location of the cutting plane within the $\{N_I\}$ for each processor and the threshold window saturation within the volume to be displayed. (The threshold window saturation, $\sigma$, is the percentage of the voxels within a SSG's $\{N_O\}$ which fall within the threshold window set by the user. Because the threshold window saturation is unknown before the image is formed, it is approximated by the expected threshold window saturation, $\sigma_e$. The expected value is obtained by histogramming $\{N_O\}$ as each SSG loads its data set and then computing each density value's percentage population within $\{N_O\}$. The value $\sigma_e$ is obtained by summing the density value population values of the density values which lie within the threshold window.) In general, a cutting plane close to the front of the scene indicates that a recursive front-to-back algorithm should be used, while a plane location toward the rear of the scene calls for the use of a recursive back-to-front algorithm. Threshold window saturation affects the cutover depth by advancing the cutover point in the $\{N_I\}$ at each processor as threshold window saturation decreases. The remainder of this section describes an approach to selection of the algorithm cutover point and resulting processor performance.

The basis for selection of either the adaptive FTB or the BTF algorithm is the $z'$-dimension location of the cutting plane in image space and $\sigma_e$. This strategy is justified by two observations. First, for cutting planes close to the front of the scene, the adaptive BTF algorithm must process most of the data, whereas the adaptive FTB algorithm processes relatively little giving the FTB algorithm a performance edge. As the cutting plane moves deeper into the scene, the two algorithms approach the same performance until, at the cutover point, the overhead of the adaptive FTB algorithm equals the pixel overwriting cost of the adaptive BTF algorithm. From the cutover point on to the back of the scene, the adaptive BTF algorithm is faster than the adaptive FTB algorithm. These ideas are illustrated in FIG. 6 where a cutting plane dividing a volume in image space is depicted. For illustrative purposes, the volume is divided between two processors. The cutting plane lies close to the front of the portion of image space operated upon by processor one, so this processor should employ the adaptive FTB algorithm to generate its image. However, the cutting plane lies close to the back of the volume processed by processor two, so the best choice for this processor is the adaptive BTF algorithm.

The second observation is that, for low $\sigma_e$ values, the adaptive BTF algorithm computes relatively few image space coordinates because of its use of the pre-generated object space oct-tree. This is in contrast to the FTB algorithm which generates a substantial fraction of these same coordinates again when attempting to fill screen space with a sparsely populated image space.

Given this basic strategy for dynamic algorithm selection, we investigated the positioning of the algorithm cutover point, X, by gathering image processor image rendering elapsed time performance data on each of the adaptive HSR/volume rendering algorithms. This testing was combined with the examination of the effect of the threshold window saturation, $\sigma$, upon the algorithm's performance by using a range of $\sigma$ values. For each $\sigma$, the effect of voxel value distribution within $\{N_O\}$ was determined for the extreme cases: desired voxel values clumped in a compact sub-volume within $\{N_O\}$ or desired voxel values randomly distributed within $\{N_O\}$. Results indicate that neither random nor clumped distribution affects adaptive BTF algorithm rendering speed but that the adaptive FTB algorithm performs better for clumped than random distributions. Therefore, to encompass the expected performance range of the dynamic volume rendering algorithm, the following analysis is based upon timing results obtained from the random as well as the clumped voxel value distributions.

Experimentation revealed that X varies with the angular rotation about the x- and y-axis and with $\sigma$.

From examination of many data sets, it became apparent that X moves forward within the image space cube of a processor as the value of $\sigma$ decreases. This result is expected because the performance of the adaptive BTF algorithm improves with decreasing $\sigma$, while performance of the adaptive FTB algorithm initially worsens and then improves to nearly the $\sigma=100\%$ level. Given that X moves forward with decreasing $\sigma$, and does so smoothly, X versus $\sigma$ was examined for the test cases and several object space, $\{N_O\}$ sizes, yielding a distribution of cutover locations within the volumes. The examination indicated that there is a clear central tendency to the location of X, but also that there is a wide distribution around this central point. As no single value was clearly superior, an analytic expression for the cutover point for a given X is required. To prevent premature cutover of the algorithms, the largest X value for each $\sigma$ was selected from each X vs $\sigma$ plot, and these points were used to derive a second degree polynomial expression for algorithm cutover point location. For illustrative purposes, the following equations are provided, the equations to be used in a given multiprocessor architecture are specific to the computer architecture and operating system employed for the volume rendering operation.

For a $8 \times 8$ object space cube:

$$X = 6.25\sigma^2 + 1.25\sigma + 7.81 \tag{1}$$

For a $16 \times 16$ object space cube:

$$X = 6.25\sigma^2 + 11.25\sigma + 8.81 \tag{2}$$

For a $32 \times 32$ object space cube:

$$X = 18.75\sigma^2 + 13.75\sigma + 14.43 \tag{3}$$

By determining these equations for the specific processor architecture employed in the multiprocessor, and using the $\sigma_e$ estimation procedure, the BTF/FTB algorithm cutover point can be estimated independently by each processor for a given set of user threshold window settings. Once $\sigma$ is in hand, the appropriate equation from equations 1–3 is used to calculate X, if the cutting plane is ahead of X, then the adaptive FTB algorithm is used, otherwise the adaptive BTF algorithm is selected by the processor. Table 1 presents the Dynamic Hidden-Surface Removal/Volume Rendering algorithm.

The dynamic algorithm approach rests upon the use of data partitioning among the processors in a general-purpose MIMD parallel architecture and dynamic selection of the fastest rendering algorithm by each processor based upon its local processing situation. Because an MIMD architecture permits independent operation by the processors in the machine, a dynamic algorithm selection strategy offers the opportunity for localized optimal algorithm selection. In order to realize the capability for dynamic algorithm selection, two adaptive recursive hidden-surface removal/volume rendering algorithms were designed. Individually, these algorithms offer a performance improvement over the non-adaptive variations, but, in addition, they each provide their best performance under different processing conditions. The Dynamic Volume Rendering algorithm capitalizes upon the strengths of the adaptive algorithms by allowing each processor to select the algorithm which offers the best performance given the processing situation faced by the individual processors.

6. Flow Charts and Program Listings.

FIGS. 8 to 11a are flow charts, and appendices H and J taken from said thesis are listings in pseudo code.

6a. System Operation Overview

Figure 8:
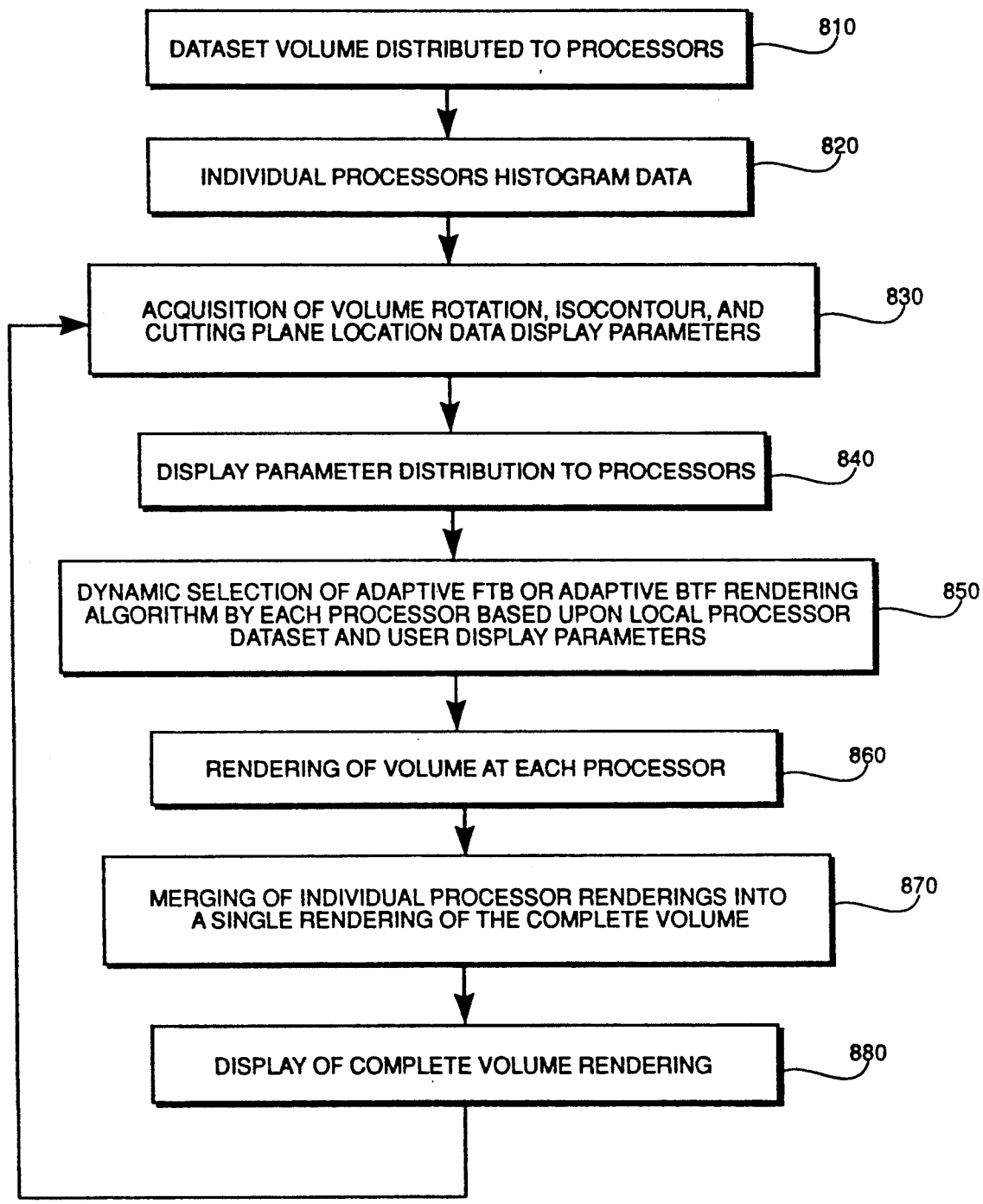
FIG. 8 is a system operation overview flowchart.

As shown in the system operation overview flow chart of FIG. 8, the operation begins at block 810 with the distribution of the data set volume to the several processors of the multiprocessor computer system. At block 820, the individual processors histogram the data. At block 830, there takes place the acquisition of volume rotation, isocontour, and cutting plane location data display parameters from the system user. Block 840 shows the display parameter distribution to the processors. At block 850 occurs the dynamic selection of the adaptive front-to-back or adaptive back-to-front volume rendering algorithm by each processor based upon the local processor data set and user display parameters. Rendering of the volume at each processor occurs at block 860. At block 870, occurs the merging of individual processor renderings into a single rendering of the complete volume. Block 880 indicates the display of the complete volume rendering.

6b. Dynamic Volume Rendering Algorithm

Figure 9:
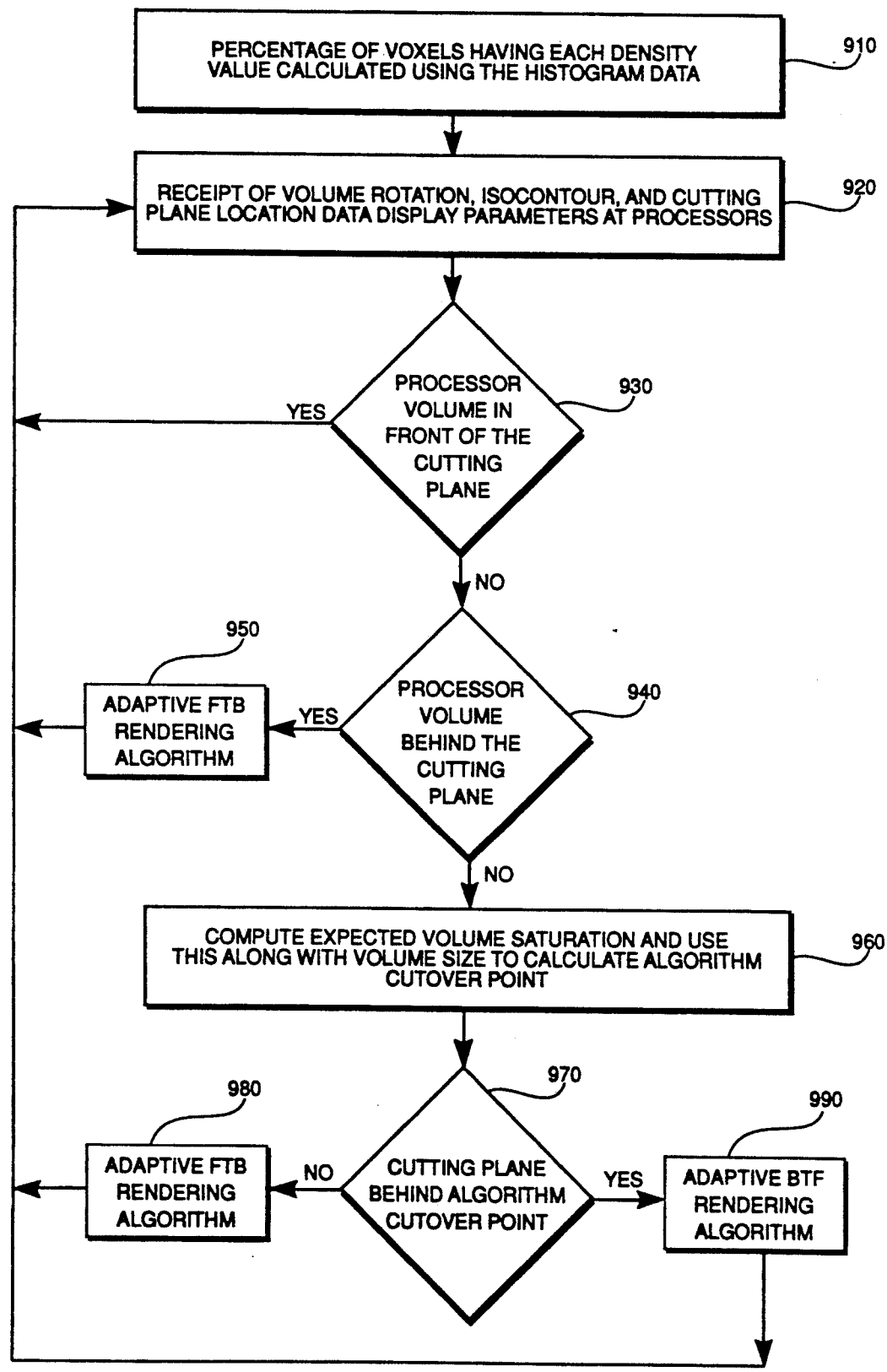
FIG. 9 is a flowchart of the dynamic volume rendering algorithm.

FIG. 9 is a flow chart of the dynamic adaptive hidden-surface removal/volume rendering algorithm. At block 910, the percentage of voxels having each density value is calculated using the histogram data (identical to block 820 of FIG. 8). Block 920 shows receipt of volume rotation, isocontour, and cutting plane location data display parameters at the processors (identical to block 830 of FIG. 8). At block 930, at each processor in the machine, there is a determination of whether the image space volume corresponding to the data set is in front of the cutting plane, and if so the operation returns to block 920, since the processor's volume does not contribute information to the final rendered image. Otherwise the program proceeds to block 940 to determine if the processor volume is completely behind the cutting plane. If yes, the operation goes to the adaptive front-to-back rendering algorithm (described in FIG. 11) at block 950 to render the processor's volume. If the decision at block 940 is no, the operation goes to block 960 to compute the expected volume saturation and to use this value along with the volume size to calculate the BTF/FTB algorithm cutover point. At block 970, there is a determination of whether the cutting plane is behind the algorithm cutover point, if not the adaptive front-to-back volume rendering algorithm shown as block 980 (and described in FIG. 11) is used, and if yes, the adaptive back-to-front volume rendering algorithm shown as block 990 (described in FIG. 10) is used.

6c. Adaptive Back-to Front Volume Rendering Algorithm

Figure 10:
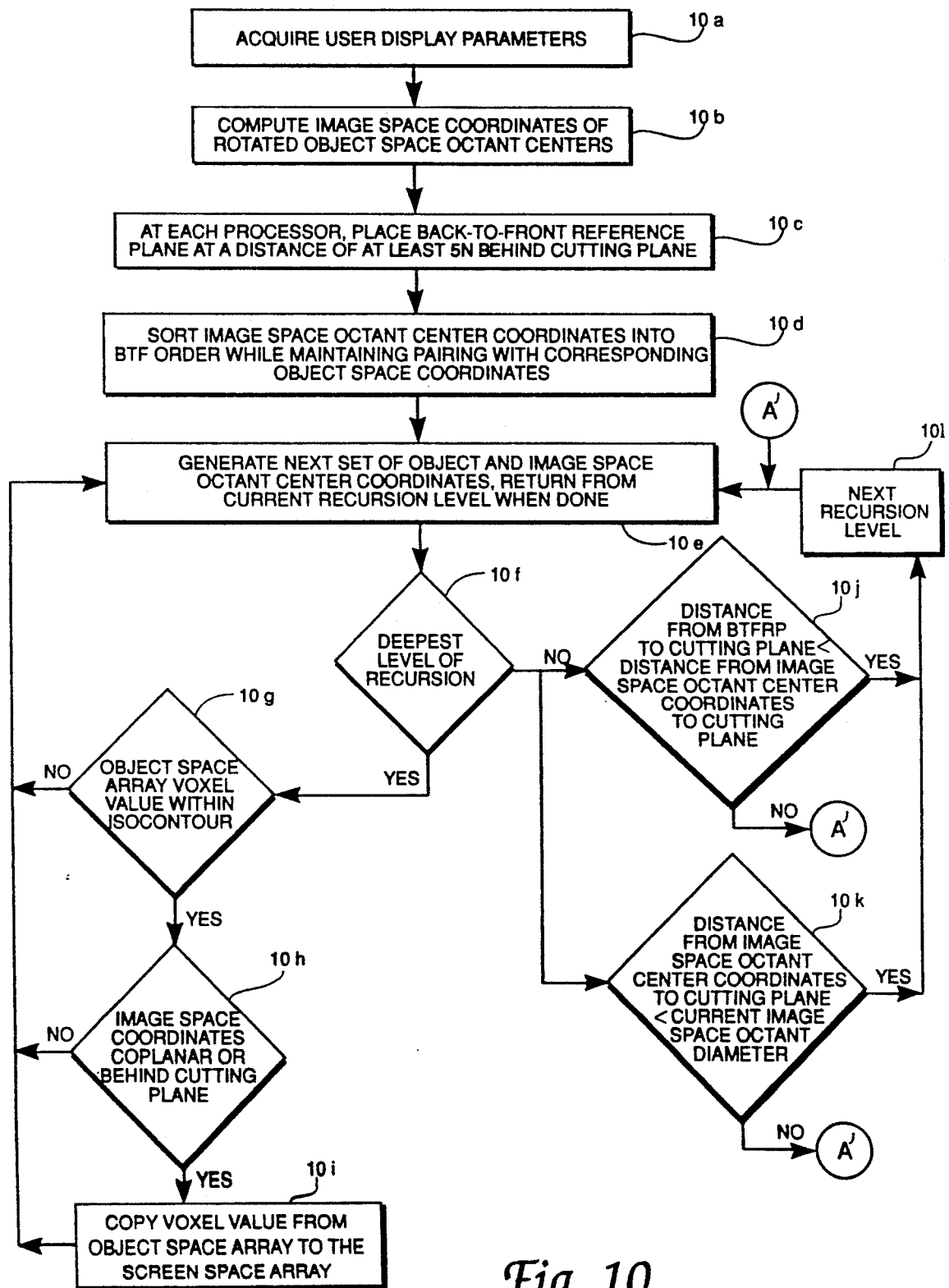
FIG. 10 is a flowchart of the adaptive back-to-front rendering algorithm.

FIG. 10 is a flow chart of the adaptive back-to-front HSR/volume rendering algorithm. The process starts at block 10a by acquiring user display parameters (block 820 in FIG. 8). The process then goes to block 10b to compute the image space coordinates of the rotated object space octant centers. At each processor, as shown at block 10c, the program will place the back-to-front reference plane at a distance of at lease 5N behind the cutting plane, N being the dimension of object space within each processor. At block 10d, the image space octant center coordinates are sorted in BTF order while maintaining pairing with corresponding object space coordinates. This operation is required in order to correctly render the volume in BTF order. At block 10e, the program will generate the next set of object and image space octant center coordinates at the next level of recursion, and return from the current recursion level when done. The algorithm starts at the center of the volume and generates each of the eight octant center coordinates in BTF order.

Then at block 10f there is a decision as to whether the algorithm is at the deepest level of recursion. If yes, then the algorithm has generated a single voxel coordinate, which should be mapped from object to image space. If the deepest level of recursion has been attained, there is a check at a decision block 10g for the object space array voxel value being within the isocontour hence, part of the body to be displayed. If yes, there is a further check at a decision block 10h for the image space coordinates being coplanar or behind the cutting plane. If yes, then at block 10i the operation is to copy the voxel value from the object space array whose location is given by the object space coordinate values to the screen space array. A no for either block 10g or block 10h, or at the completion of the operation for block 10i, results in a return to block 10e to generate the next set of coordinates.

If the decision at block 10f is no, the operation goes to decision blocks 10j and 10k to determine if the octant indicated by the image space coordinates should be processed. At block 10j, there is a check as to whether the distance from the back-to-front reference plane (BTFRP) is less than the distance from the image space octant center coordinates to the cutting plane. At block 10k, there is a check as to whether the distance from the image space octant center coordinates to the cutting plane is less the current image space octant diameter. A yes from either block 10j or block 10k causes the program to go to block 10l to begin rendering the indicated suboctant at the next recursion level, and then back to block 10e to generate the first set of coordinates at the next level of recursion. A no from either block 10j or block 10k causes a direct return to block 10e where the next set of coordinates at the current level of recursion are generated.

6d. Adaptive Front-to-Back Volume Rendering Algorithm

Figure 11:
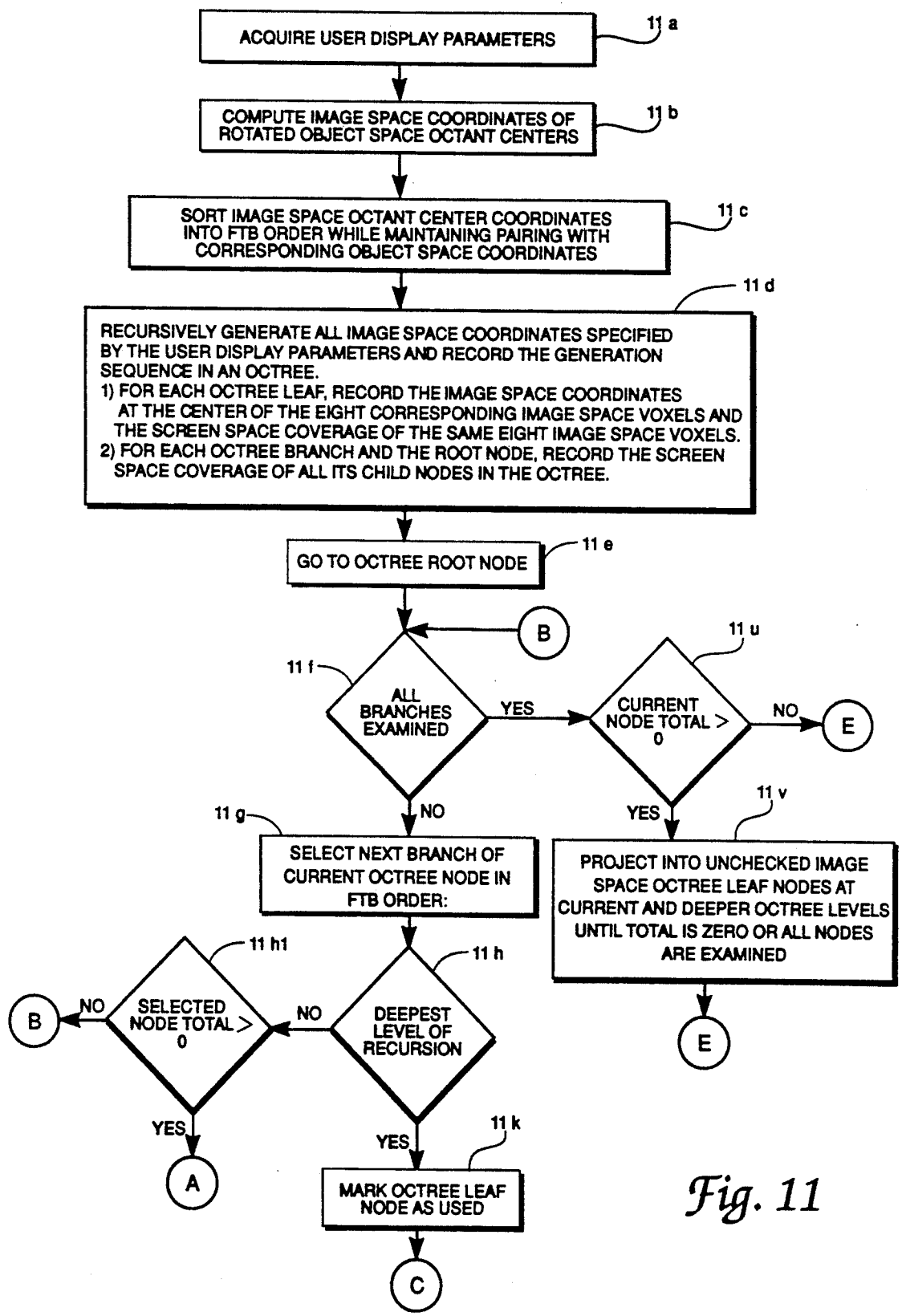
FIGS. 11 and 11a comprise a flowchart of the adaptive front-to-back volume rendering algorithm.
Figure 11A:
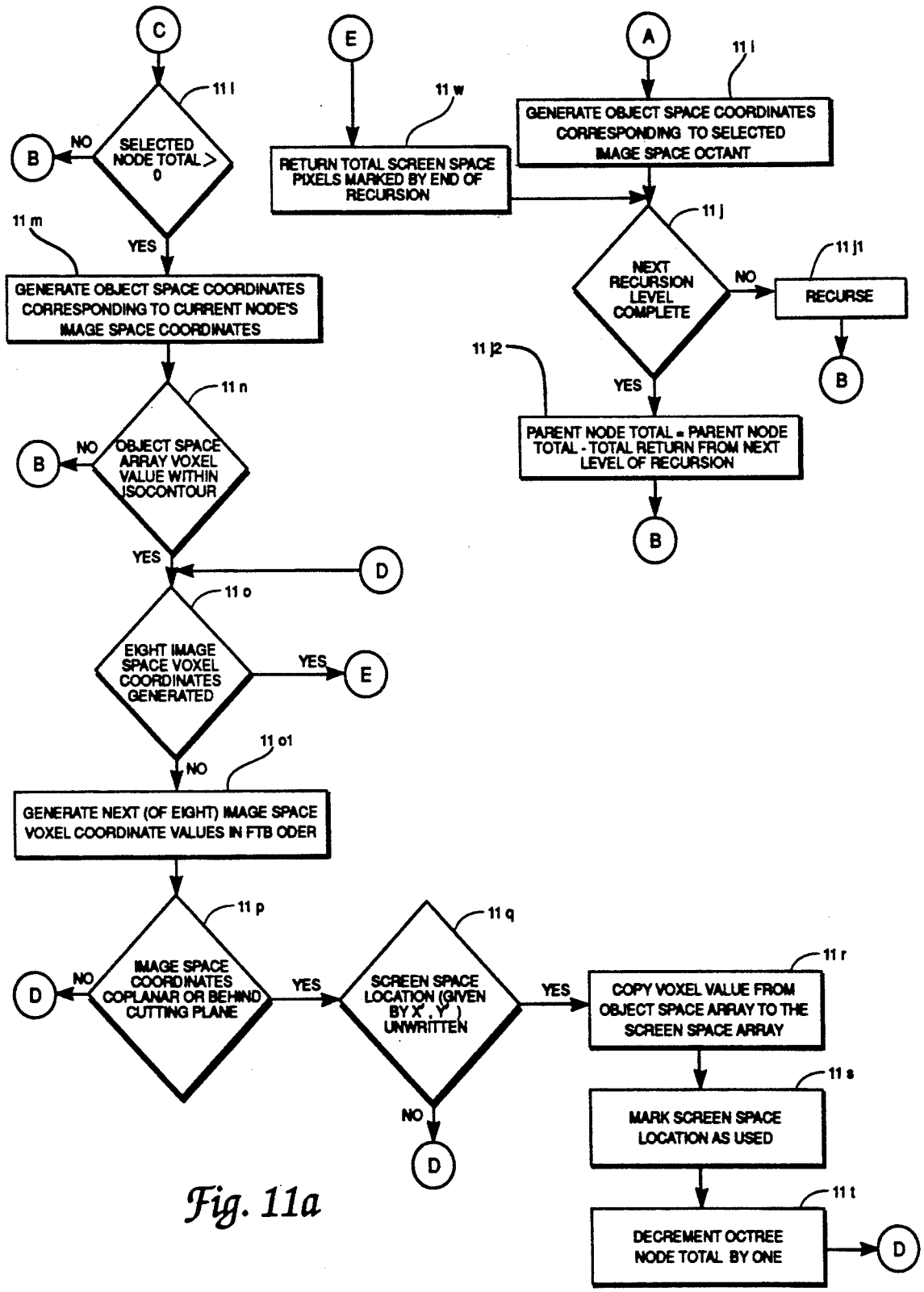

FIGS. 11 and 11a comprise a flow chart of the adaptive front-to-back volume rendering algorithm. The process starts at block 11a by acquiring user display parameters for rotation, isocontour and cutting plane. The process then goes to block 11b to compute the image space coordinates of the rotated object space octant centers. At block 11c, the operation is to sort the image space octant center coordinates in FTB order while maintaining pairing with corresponding object space coordinates. At block 11d, the program will recursively generate all image space coordinates using the rotation parameters specified by the user, and record the generation sequence in an oct-tree, 1) for each oct-tree leaf, record the image space coordinates at the center of the eight corresponding image space voxels and the screen space coverage of the same eight image space voxels, 2) for each oct-tree branch and the root node, record the screen coverage of all its child nodes in the oct-tree as a total number of pixels to be lit.

At block 11e, go to the oct-tree root node. At block 11f, determine if all branches at the current recursion level have been examined, and if not go to block 11g to select the next branch of the current oct-tree node in FTB order. At block 11h determine if the algorithm is at the deepest level of recursion, and if not, go to block 11h1 to determine if the selected node total is greater than zero, and if not go to block 11f.

At block 11h1, if the total at the node selected at block 11h is greater than zero, go to block 11i. At block 11i, generate the object space coordinates corresponding to the selected image space octant.

At block 11j, determining if the next recursion level is complete, if not recurse to the next oct-tree level and go to block 11f. If yes set the current oct-tree node's parent node lit pixel total equal to the previous parent node total minus the total number of pixels lit by the current oct-tree node, and go to block 11f.

At block 11k, if at block 11h this is determined to be the deepest level of recursion, mark the oct-tree leaf node as used.

At block 11l, determine if the selected node total is greater than zero, if not, go to block 11f.

At block 11m, if the total is greater than zero, generate the object space coordinates corresponding to current node's image space coordinates.

At block 11n, determine if the object space array voxel value is within the isocontour, if not, go to block 11f.

At block 11o, determine if the eight image voxel coordinates belonging to the current oct-tree leaf node have been generated, and if not, generate the next (of eight) image space voxel coordinate values in front-to-back order at block 11o1.

At block 11p, determine if the image space coordinates are coplanar or behind the cutting plane, and if not, go to block 11o.

At block 11q, if block 11p evaluated to yes, determine if the screen space location (given by the image space X', Y' coordinates) are unwritten, and if not, go to block 11o.

At block 11r, if yes, copy the voxel value from the object space to the screen space array.

At block 11s, mark the just written screen space location as used.

At block 11t, decrement the oct-tree node total by one, and go to block 11o.

At block 11u, if at block 11f, all branches have been examined, determine if the current node total is greater than zero. If no, go to block 11w.

At block 11v, if block 11u evaluates to yes, project into the unchecked image space oct-tree leaf nodes at the current and deeper oct-tree levels until the total number of pixels to written total is zero or all nodes at the current and deeper levels are examined.

At block 11w, return total screen space pixels written by the end of recursion, and go to block 11j.

If at block 11u the current node total is not greater than zero, go to block 11w.

It is understood that certain modifications to the invention as described may be made, as might occur to one with skill in the field of the invention, within the scope of the appended claims.

Therefore, all embodiments contemplated hereunder which achieve the objects of the present invention have not been shown in complete detail. Other embodiments may be developed without departing from the scope of the appended claims. For example, the invention could be implemented on a general purpose computer with sufficient memory, in place of a MIMD computer, with the memory organized into "units" in place of the separate processors, but such a system would of course be much slower.

TABLE 1

The Dynamic Volume Rendering Algorithm a. Produce a histogram of $\{N_O\}$ as the data volume is loaded at each processor.
b. After the data set is fully loaded, the percentage of the voxels in $\{N_O\}$ having each density value is calculated using the histogram data.
c. For each set of user inputs, each processor independently determines if its $\{N_j\}$ lies in front of the cutting plane using the cutting plane intersection and back-to-front reference plane distance tests in the adaptive BTF Volume Rendering algorithm.
d. Each processor whose data lies in front of the cutting plane performs no computations.
e. If a processor's $\{N_j\}$ volume is fully behind the cutting plane, the adaptive FTB algorithm is used by the processor to generate its image space output.
f. If the cutting plane intersects a processor's $\{N_j\}$, the processor computes $\sigma_e$ by summing the histogram percentages and uses this figure to calculate X.
g. If the cutting plane lies behind X, then the adaptive BTF algorithm is used, otherwise the adaptive FTB algorithm is used.

APPENDIX H

THE ADAPTIVE TERMINATION BACK-TO-FRONT RECURSIVE HIDDEN-SURFACE REMOVAL ALGORITHMS

H.1 INTRODUCTION.

Figure 3:
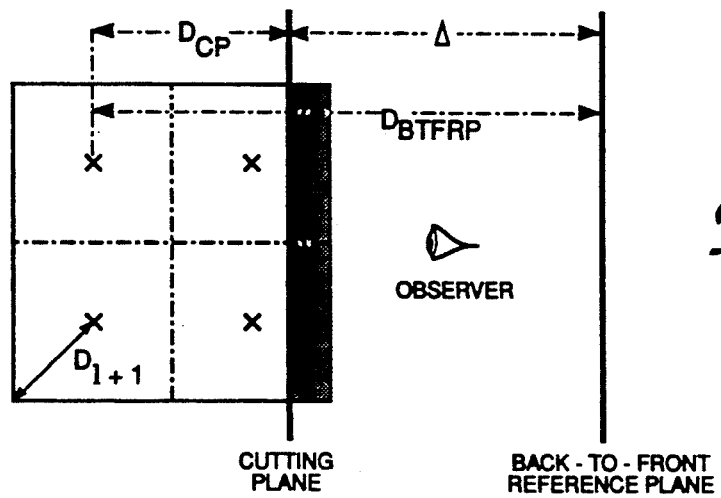
FIG. 3 is a diagram illustrating processed volume savings realized using the Adaptive Recursive Back-to-Front Hidden-Surface Removal Algorithm.

This appendix presents the adaptive termination back-to-front recursive hidden-surface removal algorithms using the octant numbering scheme presented in Figure 3.2.

Depending upon whether the implementation uses a sub-cube center or front-lower left criteria for selecting the $\{\mathcal{P}_O\}$ set, one of two different adjustments to the algorithm must be made at the deepest level of recursion in order to generate correct image space and object space coordinate values. Rather than complicate the presentation of the algorithm with these conditions, they are described here with the understanding that they are engaged when required. First, because for a front-lower left (FLL) $\{\mathcal{P}_O\}$ rotation is best performed by rotating the scene about the origin without translating the scene center to the origin, negative values for image space coordinates, and hence image array indices, are produced at various rotations. To insure that the image is written into the image output buffer, an image array offset equal to N is added to each image array coordinate. The image array is correspondingly expanded to a size of 2N x 2N. For a sub-cube center (SCC) $\{\mathcal{P}_O\}$, an image array index offset is not required. Second, for a SCC $\{\mathcal{P}_O\}$, the algorithm produces the set of coordinates at sub-cube octant 3 and not the sub-cube center at recursion level m-1. This mis-positioning can be corrected by adjusting each of the coordinates generated at level m-1 by applying R twice to $\{\mathcal{V}_{I3}\}$ level m-1 and subtracting the resultant vector from each coordinate set at level m-1. The FLL technique does not have this problem as it is designed to produce coordinate values from FLL octant coordinate values and not sub-cube center values.

H.2 THE ADAPTIVELY TERMINATING BACK-TO-FRONT ALGORITHM.

Given:
    a normal resolution scene size of N x N x N where $N = 2^m$
    volume center or front-lower left coordinates $\{V_c\} = \{x_c, y_c, z_c\}$
    object space octant generation coordinate set $\{O\} = \{\{O_{0x}, O_{0y}, O_{0z}\} ... \{O_{7x}, O_{7y}, O_{7z}\}\}$
    *map* - a function which returns the original object space octant number given an image space octant number
    object_array - size N x N x N which contains a 3D image
    image_array - size 2N x 2N
    Plane_Coeffs - the coefficients of the equation which positions the cutting plane in image space

*behind*($I_x$, $I_y$, $I_z$, Plane_Coeffs) - a function which determines if the given image space coordinates are lying on or behind the cutting plane.

BTFRP - the image space plane equation coefficients for the Back-to-Front Reference Plane, positioned parallel to the cutting plane and at a distance -5N along the z-axis from it.

*Plane_Distance*($I_x$, $I_y$, $I_z$, Plane_Coeffs) - a function which returns the distance from the cutting plane to image space coordinates $I_x$, $I_y$, $I_z$

*BTFRP_Distance*($I_x$, $I_y$, $I_z$, BTFRP) - a function which returns the distance between the BTFRP and image space coordinates $I_x$, $I_y$, $I_z$

*BTFRP_Plane_Distance*(Plane_Coeffs,BTFRP) - a function which returns the distance between the BTFRP and the cutting plane L - length of the x-axis projection of the vector running from an octant's generation point to the furthest point in the octant, equal to N/2 for the FLL approach and N/4 for the SCC approach object_rootptr - a pointer to the root node of an oct-tree, points to an array of eight other pointers, each entry of which contains a pointer to an oct-tree node containing an array of eight pointers object_leaf - the oct-tree leaf structure which contains a voxel density value for the corresponding volume in object space & entry in the object_array Window - a user defined upper and lower threshold for the voxel values which may appear in the rendered image

*recurse_build_objecttree*($x_c$, $y_c$, $z_c$, object_rootptr,1)
until FOREVER do
{
  *acquire_user_display_requirements*(x_rot, y_rot, z_rot, Plane_Coeffs, Window)
  /* compute image space volume center coordinates {$V_i$} */
  *compute_image_space_coordinates*($x_c$,$y_c$,$z_c$, $x'_c$, $y'_c$, $z'_c$, x_rot, y_rot, z_rot)
  /* determine image space location of BTFRP, at distance -5N from cutting plane */
  *position_BTFRP*(Plane_Coeffs, BTFRP)
  /* compute image space octant center coordinate set {I} */
  for s = 0 to 7 do
    *compute_image_space_coordinates*($O_{s_x}$, $O_{s_y}$, $O_{s_z}$, $I_{s_x}$, $I_{s_y}$, $I_{s_z}$, x_rot, y_rot, z_rot)
  /* sort image space coordinates sets into back to front order, with deepest octant's coordinates in leading set position */
  *back-to-front_sort*({I})
  /* recursively compute all image space coordinates */
  *recurse_display*(I, object_rootptr, $x'_c$, $y'_c$, $z'_c$, 1)
}

*recurse_display*(I, objecttree_ptr, $C_{i_x}$, $C_{i_y}$, $C_{i_z}$, recursion_level)
{
for j = 0 to 7 do
{
  k = *map*(j)
  /* compute new image space octant center coordinates */
  if j = (1,3,5,7)   then $C_{x'} = C_{i_x} + (I_{j_x} >> \text{recursion\_level}^1)$
        else $C_{x'} = C_{i_x} - (I_{j_x} >> \text{recursion\_level})$
  if j = (2,3,6,7)   then $C_{y'} = C_{i_y} + (I_{j_y} >> \text{recursion\_level})$
        else $C_{y'} = C_{i_y} - (I_{j_y} >> \text{recursion\_level})$ if $j = (0,1,2,3)$ then $C_z' = C_{i_z} + (I_{j_z} >> \text{recursion\_level})$ else $C_z' = C_{i_z} - (I_{j_z} >> \text{recursion\_level})$ /* check to determine if current image space coordinate is further from BTFRP than the cutting plane or if cutting plane passes through the current image space octant */ if recursion_level < $\log_2(N)$ <u>and</u>
    (*BTFRP_Plane_Distance*(Plane_Coeffs,BTFRP)<
                    *BTFRP_Distance*($C_x'$,$C_y'$,$C_z'$,BTFRP)) <u>or</u>
    (Plane_Distance($C_x'$,$C_y'$,$C_z'$,Plane_Coeffs) <
                    $\sqrt{(L>>(\text{recursion\_level-1}))^2 * 3}$ then
    *recurse_display*(I, objecttree_ptr->branch_array[k],
                    $C_x'$, $C_y'$, $C_z'$, recursion_level+1)

---

[1] >> is defined to be the right-shift operator.

if (recursion_level = $\log_2(N)$) <u>and</u>
    (objecttree_ptr->branch_array[k]->object_leaf ⊃ Window)
then
/* are at the deepest branch of the object tree, so to achieve supersampling just plot the eight image space points using the one required object space leaf's value */
    for h = 0 to 7 do
    {
    /* compute new image space octant center coordinates */
    if h = (1,3,5,7)    then $C_x'' = C_x' + (I_{h_x} >> m+1)$
        else $C_x'' = C_x' - (I_{h_x} >> m+1)$
    if h = (2,3,6,7)    then $C_y'' = C_y' + (I_{h_y} >> m+1)$
        else $C_y'' = C_y' - (I_{h_y} >> m+1)$
    if h = (0,1,2,3)    then $C_z'' = C_z' + (I_{h_z} >> m+1)$
        else $C_z'' = C_z' - (I_{h_z} >> m+1)$ if *behind*($C_x'$, $C_y'$, $C_z'$, Plane_Coeffs) then
        image_array[$C_x''$][$C_y''$] = objecttree_ptr->branch_array[k]->object_leaf
    }
}}

*recurse_build_objecttree*($C_{o_x}$, $C_{o_y}$, $C_{o_z}$, objecttree_ptr,recursion_level)
{
/* compute the object space coordinates (which are identical to the object_array values) for each of the octants */
    for k = 0 to 7 do
    { if k = (1,3,5,7) then $C_x = C_{o_x} + (O_{k_x} \gg \text{recursion\_level})$
    else $C_x = C_{o_x} - (O_{k_x} \gg \text{recursion\_level})$ if k = (2,3,6,7) then $C_y = C_{o_y} + (O_{k_y} \gg \text{recursion\_level})$
    else $C_y = C_{o_y} - (O_{k_y} \gg \text{recursion\_level})$ if k = (0,1,2,3) then $C_z = C_{o_z} + (O_{k_z} \gg \text{recursion\_level})$
    else $C_z = C_{o_z} - (O_{k_z} \gg \text{recursion\_level})$

```
/* if are at a level in the oct-tree where branch nodes are required, create a new
   branch node in the object space oct-tree holding an array of eight pointers */
if recursion_level < log2(N) then
            objecttree_ptr->branch_array[k]->new_objecttree_node
/* if are at a level in the oct-tree where leaf nodes are required, create a new leaf
   node in the object space oct-tree holding an integer density value */
if recursion_level = log2(N) then
            objecttree_ptr->branch_array[k]->object_leaf if recursion_level < log2(N)
    then    /* pass coordinates and pointer to next level in oct-tree */
        recurse_build_objecttree(Cx, Cy, Cz, objecttree_ptr->branch_array[k],
                                recursion_level+1)

if recursion_level = log2(N)  /* record the object array value in the oct-tree leaf */
    then
        objecttree_ptr->branch_array[k]-> object_leaf = object_array [Cx][Cy][Cz]

}}
```

APPENDIX J

THE ADAPTIVE TERMINATION FRONT-TO-BACK RECURSIVE HIDDEN-SURFACE REMOVAL ALGORITHMS

J.1 INTRODUCTION.

This appendix presents the adaptive termination front-to-back recursive hidden-surface removal algorithms using the octant numbering scheme presented in Figure 3.2. Depending upon whether the implementation uses a sub-cube center or front-lower left criteria for selecting the $\{P_o\}$ set, one of two different adjustments to the algorithm must be made at the deepest level of recursion in order to generate correct image space and object space coordinate values. Rather than complicate the presentation of the algorithm with these conditions, they are described here with the understanding that they are engaged when required. First, because for a front-lower left (FLL) $\{\mathcal{P}_O\}$ rotation is best performed by rotating the scene about the origin without translating the scene center to the origin, negative values for image space coordinates, and hence image array indices, are produced at various rotations. To insure that the image is written into the image output buffer, an image array offset equal to N is added to each image array coordinate. The image array is correspondingly expanded to a size of 2N x 2N. For a sub-cube center (SCC) $\{\mathcal{P}_O\}$, an image array index offset is not required. Second, for a SCC $\{\mathcal{P}_O\}$, the algorithm produces the set of coordinates at sub-cube octant 3 and not the sub-cube center at recursion level m-1. This mis-positioning can be corrected by adjusting each of the coordinates generated at level m-1 by applying R twice to $\{\mathcal{V}_{I3}\}$ level m-1 and subtracting the resultant vector from each coordinate set at level m-1. The FLL technique does not have this problem as it is designed to produce coordinate values from FLL octant coordinate values and not sub-cube center values.

J.2 THE ADAPTIVELY TERMINATING FRONT-TO-BACK ALGORITHM.

Given:
a normal resolution scene size of N x N x N where $N = 2^m$
volume center or front-lower left coordinates $\{V_c\} = \{x_c, y_c, z_c\}$
object space octant generation coordinate set $\{O\} = \{\{O_{0x}, O_{0y}, O_{0z}\}$ ... $\{O_{7x}, O_{7y}, O_{7z}\}$
*map* - a function which returns the original object space octant number given an image space octant number
object_array - size N x N x N which contains a 3D image
image_array - size 2N x 2N, initialized to -1
Plane_Coeffs - the coefficients of the equation which positions the cutting plane in image space
*behind*($I_x$, $I_y$, $I_z$, Plane_Coeffs ) - a function which determines if the given image space coordinates are lying on or behind the cutting plane.
object_rootptr - a pointer to the root node of an oct-tree, points to an array of eight other pointers, each entry of which contains a pointer to an oct-tree node containing an array of eight pointers object_leaf - the oct-tree leaf structure which contains a voxel density value
for the corresponding volume in object space & entry in the
object_array image_rootptr - the pointer to the root entry of image_tree.

image_tree - an oct-tree of depth $\log_2(N)+1$. Each branch node contains a
count of the total number of positions in image_array filled in by the
node (node_count), the array examined (see below) which indicates
if the corresponding image space has ever been checked, and
pointers to each of the eight child nodes stored in an array called
child_ptrarray. The leaves of the image space tree contain the total
count for each of the eight image space voxels they represent and the
image space coordinates of the generation point for the terminal
octant image_leaf - a structure used in image_tree to contain the total number of
image space voxels in a terminal image space octant written to screen
space and the image space coordinates of the generation point for the
terminal octant examined - an array which indicates the leaf octants checked so that only
leafs octants skipped on the first pass are examined later, if
necessary, not used for branch octants

*project_into_image_tree* - a function which determines the contribution of
each image space octant and sub-octant to the final screen image.
For this computation, octants are assumed to be solid, so no holes
occur. Octants or sub-octants which are totally obscured are given a
count of zero, otherwise a running total of the contribution of each
octant/sub-octant to the final image is kept

*form_image_tree* - a function which builds the oct-tree that image space is
projected into. Need only be built once update_box - an array of size 2N x 2N which is used to determine the
number of array elements each image space octant will project onto
the screen, initialized to -1 projection_total - the number of voxel values to be written to screen space

Window - a user defined upper and lower threshold for the voxel values
which may appear in the rendered image /* build the oct-tree used for image space projection */
*form_image_tree*(image_rootptr,1)
*recurse_build_objectree*($x_c$, $y_c$, $z_c$, object_rootptr,1)

until FOREVER do
{
 *acquire_user_display_requirements*(x_rot, y_rot, z_rot, Plane_Coeffs, Window)
/* compute image space volume center coordinates {$V_i$} */
 *compute_image_space_coordinates*($x_c,y_c,z_c$, $x'_c$, $y'_c$, $z'_c$, x_rot, y_rot, z_rot)
/* compute image space octant center coordinate set {I} */
 for s = 0 to 7 do
 *compute_image_space_coordinates*($O_{s_x}$, $O_{s_y}$, $O_{s_z}$, $I_{s_x}$, $I_{s_y}$, $I_{s_z}$,x_rot, y_rot, z_rot)
/* sort image space coordinates sets into back to front order, with deepest
 octant's coordinates in leading set position */
 *front-to-back_sort*({I})
/* Determine the contribution of each octant to the final image */
 projection_total = *project_into_image_tree*(I, image_rootptr, $x'_c$, $y'_c$, $z'_c$, 1)
/* recursively compute all image space coordinates */
 *recurse_display*(I, object_rootptr, image_rootptr, 1)
}

```
recurse_display(I, objecttree_ptr, imagetree_ptr, recursion_level)
{
  if recursion_level < log2(N) then
  { for j = 0 to 7 do
    {
    k = map(j)
    /* determine if the child octant is predicted to have spots to write to */
    if imagetree_ptr->child_ptrarray[j]->node_count > 0 then
    {
    /* new total = starting parent total - (starting child total - ending child total) */
      imagetree_ptr->node_count = imagetree_ptr->node_count -
              (imagetree_ptr->child_ptrarray[j] - recurse_display(I,
                                  objecttree_ptr->branch_array[k],
                                  imagetree_ptr->child_ptrarray[j], recursion_level+1))
    } } /* close then and loop for j */
    /* make sure that no holes remain within the space nominally filled-in by this octant
        by checking the node_count value, if there are gaps try the unexamined octants */
    if imagetree_ptr->node_count ≠ 0 then
    {
    /* perform transformation on the octants skipped at first, but must do all of them
        and all their sub-octants */
    for j = 0 to 7 do
    {
    k = map(j)
    image_ptr->node_count =
              exhaustive_recurse_display(I, objecttree_ptr->branch_array[k],
                              imagetree_ptr->child_ptrarray[j],recursion_level+1,
                              image_ptr->node_count)

} } } /* close check for holes and check for recursion_level < log2(N) */ if recursion_level = log2(N) then
  {
  /* generate the image tree and object tree pointers */
    for j = 0 to 7 do
    {
    k = map(j)
  /* start by first doing the leaf octants predicted to have image space voxels which
      will be able to write to screen space */
    if (imagetree_ptr->child_ptrarray[j]->image_leaf.count > 0) then
    {
    imagetree_ptr->examined[j] = 1    /* make sure never do leaf again */
    if (objecttree_ptr->branch_array[k]->object_leaf ⊃ Window) then
    {
  /* are at the deepest branch of the object tree, so to achieve supersampling just
      plot the eight image space points using the one required object space
      leaf's value */
            for h = 0 to 7 do
            {
            /* compute new image space octant center coordinates from stored values */
            if h = (1,3,5,7)
                then $C_{x''}$ = image_ptr->child_ptrarray[j]->image_leaf.x' + ($I_{h_x}$ >> m+1)
```

```
        else C_x" = image_ptr->child_ptrarray[j]->image_leaf.x' - (I_{h_x} >> m+1)

if h = (2,3,6,7)
    then C_y" = image_ptr->child_ptrarray[j]->image_leaf.y' + (I_{h_y} >> m+1)
    else C_y" = image_ptr->child_ptrarray[j]->image_leaf.y' - (I_{h_y} >> m+1)

if h = (0,1,2,3)
    then C_z" = image_ptr->child_ptrarray[j]->image_leaf.z' + (I_{h_z} >> m+1)
    else C_z" = image_ptr->child_ptrarray[j]->image_leaf.z' - (I_{h_z} >> m+1)

if (behind(C_x",C_y",C_y",Plane_Coeffs) and image_array[C_x"][C_y"] = -1) then
{
image_array[C_x"][C_y"] = objecttree_ptr->branch_array[k]->object_leaf
image_ptr->node_count = image_ptr->node_count - 1
projection_total = projection_total - 1;
}
}}}  /* close for loop */
/* make sure that no holes remain which this octant could fill in */
if image_ptr->node_count ≠ 0 then   /* transform any leaf nodes not plotted */
{
/* generate the branch level image tree and object tree pointers for skipped octants */
for j = 0 to 7 do
{
k = map(j)
/* examine those leaf octants not already transformed into image space */
if image_ptr->examined[j] ≠ 1 then   /* leaf not checked */
{
image_ptr->examined[j] = 1          /* don't check the leaf again */
/* are at the deepest branch of the object tree, so to achieve supersampling just plot
the eight image space points using the one required object space leaf's value */
if (objecttree_ptr->branch_array[k]->object_leaf ⊃ Window) then
{
    for h = 0 to 7 do
    {
    /* compute new image space octant center coordinates from stored values */ if h = (1,3,5,7)
        then C_x" = image_ptr->child_ptrarray[j]->image_leaf.x' + (I_{h_x} >> m+1)
        else C_x" = image_ptr->child_ptrarray[j]->image_leaf.x' - (I_{h_x} >> m+1)

if h = (2,3,6,7)
        then C_y" = image_ptr->child_ptrarray[j]->image_leaf.y' + (I_{h_y} >> m+1)
        else C_y" = image_ptr->child_ptrarray[j]->image_leaf.y' - (I_{h_y} >> m+1)

if h = (0,1,2,3)
        then C_z" = image_ptr->child_ptrarray[j]->image_leaf.z' + (I_{h_z} >> m+1)
        else C_z" = image_ptr->child_ptrarray[j]->image_leaf.z' - (I_{h_z} >> m+1)

if (behind(C_x",C_y",C_y",Plane_Coeffs) and image_array[C_x"][C_y"] = -1) then
    {
    image_array[C_x"][C_y"] = objecttree_ptr->branch_array[k]->object_leaf
    image_ptr->node_count = image_ptr->node_count - 1
    projection_total = projection_total - 1;
```

```
        }}}
      }  /* close node_count check */
    }} /* close outer for loop */
  } /* close recursion level = log_2(N) */
  /* update the parent's total */
    if (image_ptr->node_count ≥ 0) then return(image_ptr->node_count)
            else return(0)
  } /* close recurse display function */
exhaustive_recurse_display(I, objecttree_ptr, imagetree_ptr, recursion_level,total)
{
  if recursion_level < log_2(N) then
  {
  for j = 0 to 7 do
    {
    k = map(j)
    /* write the octant and update this level's total to be written */
      total = exhaustive_recurse_display(I, objecttree_ptr->branch_array[k],
                           imagetree_ptr->child_ptrarray[j],
                           recursion_level+1, total)
    /* can prematurely return only when no possibility of gaps exists */
      if (projection_total = 0) then return(0)
    } /* close then and loop for j */
  } /* close < log_2(N) */ if recursion_level = log_2(N) then
  {
  /* generate the image tree and object tree pointers */
  for j = 0 to 7 do
    {
    k = map(j)
    if (image_ptr->examined[j] ≠ 1) then
      {
      image_ptr->examined[j] = 1      /* make sure leaf never done again */
  /* are at the deepest branch of the object tree, so to achieve supersampling just
    plot the eight image space points using the one required object space
    leaf's value */
    if (objecttree_ptr->branch_array[k]->object_leaf ⊃ Window) then
      {
      for h = 0 to 7 do
        {
        /* compute new image space octant center coordinates from stored values */
        if h = (1,3,5,7)
            then $C_{x''}$ = image_ptr->child_ptrarray[j]->image_leaf.x' + ($I_{h_x}$ >> m+1)

else $C_{x''}$ = image_ptr->child_ptrarray[j]->image_leaf.x' - ($I_{h_x}$ >> m+1)

if h = (2,3,6,7)
            then $C_{y''}$ = image_ptr->child_ptrarray[j]->image_leaf.y' + ($I_{h_y}$ >> m+1)

else $C_{y''}$ = image_ptr->child_ptrarray[j]->image_leaf.y' - ($I_{h_y}$ >> m+1)

if h = (0,1,2,3)
            then $C_{z''}$ = image_ptr->child_ptrarray[j]->image_leaf.z' + ($I_{h_z}$ >> m+1)

else $C_{z''}$ = image_ptr->child_ptrarray[j]->image_leaf.z' - ($I_{h_z}$ >> m+1)
```

```
       if (behind(C_x", C_y", C_y", Plane_Coeffs) and image_array[C_x"][C_y"] = -1) then
       {
           image_array[C_x"][C_y"] = objecttree_ptr->branch_array[k]->object_leaf
           projection_total = projection_total - 1;
           total = total - 1;
       }
     }} /* close for h loop and object value test */
  /* can only prematurely return when no possibility of gaps exists */
       if (projection_total = 0) then return(0)
    }} /* close for j loop */
  /* can't put parent total below zero, but make sure value propagates back to
     recurse_display so that calling level's parent total reflects holes filled in */
       if (total ≥ 0) then return(total) else return(0)
} /* close exhaustive_recurse_display */ recurse_build_objecttree(C_ox, C_oy, C_oz, objecttree_ptr, recursion_level)
{
/* compute the object space coordinates (which are identical to the object_array
        values) for each of the octants */
for k = 0 to 7 do
  {
   if k = (1,3,5,7)  then C_x = C_ox + (O_kx >> recursion_level¹)
                     else C_x = C_ox - (O_kx >> recursion_level)
   if k = (2,3,6,7)  then C_y = C_oy + (O_ky >> recursion_level)
                     else C_y = C_oy - (O_ky >> recursion_level)
   if k = (0,1,2,3)  then C_z = C_oz + (O_kz >> recursion_level)
                     else C_z = C_oz - (O_kz >> recursion_level)

/* if are at a level in the oct-tree where branch nodes are required, create a new
   branch node in the object space oct-tree holding an array of eight pointers */
   if recursion_level < log_2(N) then
              objecttree_ptr->branch_array[k]->new_objecttree_node
/* if are at a level in the oct-tree where leaf nodes are required, create a new leaf
   node in the object space oct-tree holding an integer density value */
   if recursion_level = log_2(N) then
              objecttree_ptr->branch_array[k]->object_leaf if recursion_level < log_2(N)
           then    /* pass coordinates and pointer to next level in oct-tree */
              recurse_build_objecttree(C_x, C_y, C_z, objecttree_ptr->branch_array[k],
                             recursion_level+1)

if recursion_level = log_2(N)  /* record the object array value in the oct-tree leaf */
           then
              objecttree_ptr->branch_array[k]-> object_leaf =
                                        object_array[C_x][C_y][C_z]
}}
```

---

[1] >> is defined to be the right-shift operator.

*project_into_image_tree* (I,image_ptr, $C_{i_x}$, $C_{i_y}$, $C_{i_z}$, recursion_level)
{
image_ptr->node_count = 0
for j=0 to 7 do
   {
/* compute new image space octant center coordinates */
   if j = (1,3,5,7)  then $C_x$' = $C_{i_x}$ + ($I_{j_x}$ >> recursion_level)
         else $C_x$' = $C_{i_x}$ - ($I_{j_x}$ >> recursion_level)
   if j = (2,3,6,7)  then $C_y$' = $C_{i_x}$ + ($I_{j_y}$ >> recursion_level)
         else $C_y$' = $C_{i_x}$ - ($I_{j_y}$ >> recursion_level)
   if j = (0,1,2,3)  then $C_z$' = $C_{i_x}$ + ($I_{j_z}$ >> recursion_level)
         else $C_z$' = $C_{i_x}$ - ($I_{j_z}$ >> recursion_level)
   if recursion_level < $\log_2(N)$ then
         image_ptr->node_count = image_ptr->node_count +
            *project_into_image_tree*(I, image_ptr->child_ptrarray[j],
                     x', y', z', recursion_level+1)
   if recursion_level = $\log_2(N)$ then
   {
   image_ptr->examined[j] = 0
   image_ptr->child_ptrarray[j]->image_leaf.count = 0 /* initialize total for leaf */
/* record the coordinates for later use in *recursive_display* */
   image_ptr->child_ptrarray[j]->image_leaf.x' = $C_x$'
   image_ptr->child_ptrarray[j]->image_leaf.y' = $C_y$'
   image_ptr->child_ptrarray[j]->image_leaf.z' = $C_z$'
/* compute the total number of points which can be written and retain the value */
   for k=0 to 7 do
      {
/* compute terminal image space octant center coordinates */
      if k = (1,3,5,7)  then $C_x$" = $C_x$' + ($I_{k_x}$ >> m+1)
            else $C_x$" = $C_x$' - ($I_{k_x}$ >> m+1)
      if k = (2,3,6,7)  then $C_y$" = $C_y$' + ($I_{k_y}$ >> m+1)
            else $C_y$" = $C_y$' - ($I_{k_y}$ >> m+1)
      if k = (0,1,2,3)  then $C_z$" = $C_z$' + ($I_{k_z}$ >> m+1)
            else $C_z$" = $C_z$' - ($I_{k_z}$ >> m+1)
/* now check to see if the image space voxel can be written */
      if *behind*($C_x$", $C_y$", $C_z$", Plane_Coeffs) and update_box = -1 then
      {
/* so update counters and make sure no other image voxel can write to that entry */
      update_box[$C_x$"][$C_y$"] = 1
      image_ptr->node_count = image_ptr->node_count + 1
      image_ptr->child_ptrarray[j]->image_leaf.count =
            image_ptr->child_ptrarray[j]->image_leaf.count + 1
   }} } /* close for k=0 to 7 and = $\log_2 N$*/
} /* close for j */
return(image_ptr->node_count) /* make sure the total is propagated up the tree */
} /* close function */

What is claimed is:

1. Apparatus controlled by a user for showing from an arbitrary orientation with an arbitrarily positioned cutting plane extracted isocontours from a three dimensional volume composed of voxels (volume elements) and rendering of a display of the three dimensional volume using a multiple-instruction, multiple-data (MIMD) computer having a plurality of processors, comprising means or first partitioning the volume among the processors, means permitting the user to indicate an isocontour to be extracted and for inserting a cutting plane into an image space volume, means for performing hidden surface removing by finding hidden voxels, and means in response thereto for rendering a two-dimensional version of a volume.

2. A dynamic hidden-surface removal/volume rendering method controlled by a user for extracting isocontours and for inserting cutting planes within a three-dimensional volume using a multiple-instruction, multiple-data (MIMD) computer having a plurality of processors, comprising the steps:

a. producing a histogram of a data set in object space $\{N_O\}$ as a data volume is loaded at each processor;

b. after the data set is fully loaded, using the histogram data to calculate a percentage of voxels in the object space set $\{N_O\}$ having each density value within the user's desired isocontour range;

c. for each set of user inputs, having each processor independently determine if its image space set $\{N_I\}$ lies in front of a cutting plane using the cutting plane intersection and back-to-front reference plane distance tests in an adaptive back-to-front hidden-surface removal/volume rendering procedure;

d. for each processor lying in front of the cutting plane, performing no computations;

e. if a processor is fully behind the cutting plane, using an adaptive front-to-back volume rendering procedure by the processor to generate its image space output;

f. if the cutting plane intersects a processor's image space set $\{N_I\}$, having the processor compute an expected threshold saturation $\sigma_e$ by summing the histogram percentages and using this figure to calculate a cutover point X;

g. if the cutting plane lies behind the cutover point X, then using the adaptive back-to-front procedure, otherwise using the adaptive front-to-back procedure.

3. A method according to claim 2, wherein said cutover point X is determined by using an equation selected from the following equations:

for a 8×8 object space cube:
$X = 6.25\sigma^2 + 1.25\sigma + 7.81$ for a 16×16 object space cube:
$X = 6.25\sigma^2 + 11.25\sigma + 8.81$ for a 32×32 object space cube:
$X = 18.75\sigma^2 + 13.75\sigma + 14.43$ 4. A method according to claim 2, wherein said adaptive back-to-front volume rendering procedure comprises the steps:

a. acquiring user display parameters;

b. computing the image space coordinates of rotated object space octant centers;

c. at each processor, placing a back-to-front reference plane at a distance of at least 5N behind the cutting plane, N being the dimension of object space within each processor;

d. sorting image space octant center coordinates in back-to-front order while maintaining pairing with corresponding object space coordinates;

e. generating a next set of object and space octant center coordinates, and returning from a current recursion level when done;

f. determining if this is the deepest level of recursion;

g. if yes, determining if an object space array voxel value being within the isocontour, and if not going to step e;

h. if yes, determining if the image space coordinates are coplanar or behind the cutting plane, and if not going to step e;

i. if yes, copying the voxel value from the object space array to a screen space array, and going to step e;

j. if at step f it is determined that this is not the deepest level of recursion, determining if the distance from the back-to-front reference plane BTFRP is less than the distance from the image space octant center coordinates to the cutting plane, and if not going to step e;

k. also if at step f it is determined that this is not the deepest level of recursion, determining if the distance from the image space octant center coordinates to the cutting plane is less than a current image space octant diameter, and if not going to step e;

l. if at step j and also at step k the decision is "yes" going to the next recursion level, and then going to step e.

5. A method according to claim 4, wherein said adaptive front-to-back volume rendering procedure comprises the steps:

a. acquiring user display parameters;

b. computing the image space coordinates of rotated object space octant centers;

c. sorting the image space octant center coordinates in front-to-back order while maintaining pairing with corresponding object space coordinates;

d. recursively generating all image space coordinates specified by the user, displaying the parameters and recording the generation sequence in an oct-tree, 1) for each oct-tree leaf, recording the image space coordinates at the center of eight corresponding image space voxels and screen space coverage of the same eight space voxels, 2) for each oct-tree branch and a root node, recording the screen coverage of all its child nodes in the oct-tree;

e. going to the oct-tree root node;

f. determining if all branches have been examined;

g. if not, selecting the next branch of a current oct-tree node in front-to-back order;

h. determining if this is the deepest level of recursion, if not, determining if a selected node total is greater than zero, and if not going to step f;

i. if the selected node total at step h is greater than zero, generating object space coordinates corresponding to selected image space octant;

j. determining if the next recursion level is complete, if not recursing and going to step f, and if yes setting a parent node total equal to a previous parent node total minus a total returned from a next recursion level, and going to step f;

k. if at step h this is determined to be the deepest level of recursion, marking an oct-tree leaf node as used;

l. determining if the selected node total is greater than zero, if not, going to step f;

m. if yes, generating object space coordinates corresponding to current node's image space coordinates;

n. determining if the object space array voxel value is within the isocontour, if not, going to step f;

o. determining if eight image voxel coordinates have been generated, and if not, generating the next (of eight) image space voxel coordinate values in front-to-back order;

p. determining if the image space coordinates are coplanar or behind the cutting plane, and if not, going to step o;

q. if yes, determining if a screen space location (given by X', Y') are unwritten, and if not, going to step o;

r. if yes, copying the voxel value from object space to a screen space array;

s. marking screen space location as used;

t. decrementing an oct-tree node total by one, and going to step o;

u. at step f, if all branches have been examined, determining if a current node total is greater than zero;

v. if yes, projecting into unchecked image space oct-tree leaf nodes at current and deeper oct-tree levels until total is zero or all nodes are examined;

w. returning total screen space pixels lit by end of recursion, and going to step j;

x. if at step u the current node total is not greater than zero, going to step w.

6. A dynamic hidden-surface removal method controlled by a user for extracting isocontours and for inserting cutting planes within a three-dimensional volume using a multiple-instruction, multiple-data (MIMD) computer having a plurality of processors, using an adaptive back-to-front procedure comprising the steps:

a. acquiring user display parameters;

b. computing the image space coordinates of rotated object space octant centers;

c. at each processor, placing a back-to-front reference plane at a distance of at least 5N behind the cutting plane, N being the dimension of object space within each processor;

d. sorting image space octant center coordinates in back-to-front order while maintaining pairing with corresponding object space coordinates;

e. generating a next set of object and space octant center coordinates, and returning from a current recursion level when done;

f. determining if this is the deepest level of recursion;

g. if yes, determining if an object space array voxel value being within the isocontour, and if not going to step e;

h. if yes, determining if the image space coordinates are coplanar or behind the cutting plane, and if not going to step e;

i. if yes, copying the voxel value from the object space array to a screen space array, and going to step e;

j. if at step f it is determined that this is not the deepest level of recursion, determining if the distance from the back-to-front reference plane BTFRP is less than the distance from the image space octant center coordinates to the cutting plane, and if not going to step e;

k. also if at step f it is determined that this is not the deepest level of recursion, determining if the distance from the image space octant center coordinates to the cutting plane is less than a current image space octant diameter, and if not going to step e;

l. if at step j and also at step k the decision is "yes" going to the next recursion level, and then going to step e.

7. A dynamic volume rendering method controlled by a user for extracting isocontours and for inserting cutting planes within a three-dimensional volume using a multiple-instruction, multiple-data (MIMD) computer having a plurality of processors, using an adaptive front-to-back procedure comprising the steps:

a. acquiring user display parameters;

b. computing the image space coordinates of rotated object space octant centers;

c. sorting the image space octant center coordinates in front-to-back order while maintaining pairing with corresponding object space coordinates;

d. recursively generating all image space coordinates specified by the user, displaying the parameters and recording the generation sequence in an oct-tree, 1) for each oct-tree leaf, recording the image space coordinates at the center of eight corresponding image space voxels and screen space coverage of the same eight space voxels, 2) for each oct-tree branch and a root node, recording the screen coverage of all its child nodes in the oct-tree;

e. going the oct-tree root node;

f. determining if all branches have been examined;

g. if not, selecting the next branch of a current oct-tree node in front-to-back order;

h. determining if this is the deepest level of recursion, if not, determining if a selected node total is greater than zero, and if not going to step f;

i. if the selected node total at step h is greater than zero, generating object space coordinates corresponding to selected image space octant;

j. determining if the next recursion level is complete, if not recursing and going to step f, and if yes setting a parent node total equal to a previous parent node total minus a total returned from a next recursion level, and going to step f;

k. if at step h this is determined to be the deepest level of recursion, marking an oct-tree leaf node as used;

l. determining if the selected one total is greater than zero, if not, going to step f;

m. if yes, generating object space coordinates corresponding to current node's image space coordinates;

n. determining if the object space array voxel value is within the isocontour, if not, going to step f;

o. determining if eight image voxel coordinates have been generated, and if not, generating the next (of eight) image space voxel coordinate values in front-to-back order;

p. determining if the image space coordinates are coplanar or behind the cutting plane, and if not, going to step o;

q. if yes, determining if a screen space location (given by X', Y') are unwritten, and if not, going to step o;

r. if yes, copying the voxel value from object space to a screen space array;

s. marking screen space location as used;

t. decrementing an oct-tree node total by one, and going to step o;

u. at step f, if all branches have been examined, determining if a current node total is greater than zero;

v. if yes, projecting into unchecked image space oct-tree leaf nodes at current and deeper oct-tree levels until total is zero or all nodes are examined;

w. returning total screen space pixels lit by end of recursion, and going to step j;

x. if at step u the current node total is not greater than zero, going to step w.

8. Apparatus controlled by a user for extracting isocontours within a three-dimensional volume using a computer with a plurality of units with instructions and data for each unit, comprising means for first partitioning the volume among the units, means permitting the user to indicate an isocontour to be extracted and for inserting a cutting plane into an image space volume, and in response thereto rendering a two-dimensional version of a volume;

a. means for producing a histogram of a set in object space $\{N_O\}$ as a data volume is loaded at each unit;

b. means effective after the data set is fully loaded, for using the histogram data to calculate a percentage of voxels in the object space set $\{N_O\}$ having each density value;

c. for each set of user inputs, means for having each unit independently determine if its image space set $\{N_I\}$ lies in front of a cutting plane using the cutting plane intersection and back-to-front reference plane distance tests in an adaptive back-to-front hidden-surface removal procedure;

d. for each processor lying in front of the cutting plane, means for performing no computations;

e. means effective if a processor is fully behind the cutting plane, for using an adaptive front-to-back procedure by the unit to generate its image space output;

f. means effective if the cutting plane interests a processor's image space set $\{N_I\}$, for having the unit compute an expected threshold saturation $\sigma_e$ by summing the histogram percentages and for using this figure to calculate a cutover point X;

g. means effective if the cutting plane lies behind the cutover point X, for then using the adaptive back-to-front procedure, otherwise using the adaptive front-to-back procedure.

9. A dynamic hidden-surface removal/volume rendering method controlled by a user for extracting isocontours and for inserting cutting planes within a three-dimensional volume using a multiple-instruction, multiple-data (MIMD) computer having a plurality of processors, comprising the steps:

a. producing a means for characterizing the input data set of a data set in object space $\{N_O\}$ as a data volume is loaded at each processor;

b. after the data set is fully loaded, using the means for characterizing the input data set data to calculate a percentage of voxels in the object space set $\{N_O\}$ having each density value within the user's desired isocontour range;

c. for each set of user inputs, having each processor independently determine if its image space set $\{N_I\}$ lies in front of a cutting plane using the cutting plane intersection and back-to-front reference plane distance tests in an adaptive back-to-front hidden-surface removal/volume rendering procedure;

d. for each processor lying in front of the cutting plane, performing no computations;

e. if a processor is fully behind the cutting plane, using an adaptive front-to-back volume rendering procedure by the processor to generate its image space output;

f. if the cutting plane intersects a processor's image space set $\{N_I\}$, having the processor compute an expected threshold saturation $\sigma_e$ from the data set characterization and using $\sigma_e$ to calculate a cutover point X;

g. if the cutting plane lies behind the cutover point X, then using the adaptive back-to-front procedure, otherwise using the adaptive front-to-back procedure.

10. A method according to claim 9, wherein said adaptive back-to-front procedure comprises the steps:

a. acquiring user display parameters;

b. computing the image space coordinates of rotated object space octant centers;

c. at each processor, placing a back-to-front reference plane at a distance of at lease 5N behind the cutting plane, N being the dimension of object space within each processor;

d. sorting image space octant center coordinates in back-to-front order while maintaining pairing with corresponding object space coordinates;

e. generating a next set of object and space octant center coordinates, and returning from a current recursion level when done;

f. determining if this is the deepest level of recursion;

g. if yes, determining if an object space array voxel value being within the isocontour, and if not going to step e;

h. if yes, determining if the image space coordinates are coplanar or behind the cutting plane, and if not going to step e;

i. if yes, copying the voxel value from the object space array to a screen space array, and going to step e;

j. if at step f it is determined that this is not the deepest level of recursion, determining if the distance from the back-to-front reference plane BTFRP is less than the distance from the image space octant center coordinates to the cutting plane, and if not going to step e;

k. also if at step f it is determined that this is not the deepest level of recursion, determining if the distance from the image space octant center coordinates to the cutting plane is less than a current image space octant diameter, and if not going to step e;

l. if at step j and also at step k the decision is "yes" going to the next recursion level, and then going to step e.

11. A method according to claim 10, wherein said adaptive front-to-back volume rendering procedure comprises the steps:

a. acquiring user display parameters;

b. computing the image space coordinates of rotated object space octant centers;

c. sorting the image space octant center coordinates in front-to-back order while maintaining pairing with corresponding object space coordinates;

d. recursively generating all image space coordinates specified by the user, displaying the parameters and recording a generation sequence in a data structure, 1) for each primitive data-structure element, recording the image space coordinates at the center of eight corresponding image space voxels and screen space coverage of the same eight space voxels, 2) for each composite data-structure element and a root node, recording the screen coverage of all its child nodes in the data structure;

e. going to a start of the data structure;

f. determining if all composite data-structure elements have been examined;

g. if not, selecting the next element of a current data structure in front-to-back order;

h. determining if this is the deepest level of recursion, if not, determining if a selected data-structure total is greater than zero, and if not going to step f;

i. if the selected data-structure total at step h is greater than zero, generating object space coordinates corresponding to the selected image space data structure;

j. determining if the next recursion level is complete, if not recursing and going to step f, and if yes setting a parent data element total equal to a previous parent data element total minus a total returned from a next recursion level, and going to step f;

k. if at step h this is determined to be the deepest level of recursion, marking a primitive data-structure element as used;

l. determining if the selected data-structure total is greater than zero, if not, going to step f;

m. if yes, generating object space coordinates corresponding to current data element's image space coordinates;

n. determining if the object space array voxel value is within the isocontour, if not, going to step f;

o. determining if eight image voxel coordinates have been generated, and if not, generating the next (of eight) image space voxel coordinate values in front-to-back order;

p. determining if the image space coordinates are coplanar or behind the cutting plane, and if not, going to step o;

q. if yes, determining if a screen space location (given by X', Y') are unwritten, and if not, going to step o;

r. if yes, copying the voxel value from object space to a screen space array;

s. marking screen space location as used;

t. decrementing a primitive data-structure total by one, and going to step o;

u. at step f, if all data structures have been examined, determining if a current data-structure total is greater than zero;

v. if yes, projecting into unchecked image space data-structure leaf elements at current and deeper data-structure levels until total is zero or all these data structures are examined;

w. returning total screen space pixels lit by end of recursion, and going to step j;

x. if at step u the current data element total is not greater than zero, going to step w.

12. A dynamic volume rendering method controlled by a user for extracting isocontours and for inserting cutting planes within a three-dimensional volume using a multiple-instruction, multiple-data (MIMD) computer having a plurality of processors, using an adaptive front-to-back procedure comprising the steps:

a. acquiring user display parameters;

b. computing the image space coordinates of rotated object space octant centers;

c. sorting the image space octant center coordinates in front-to-back order while maintaining pairing with corresponding object space coordinates;

d. recursively generating all image space coordinates specified by the user, displaying the parameters and recording a generation sequence in a data structure, 1) for each primitive data-structure element, recording the image space coordinates at the center of eight corresponding image space voxels and screen space coverage of the same eight space voxels, 2) for each composite data-structure element and a root node, recording the screen coverage of all its child nodes in the data structure;

e. going to a start of the data structure;

f. determining if all composite data-structure elements have been examined;

g. if not, selecting the next element of a current data structure in front-to-back order;

h. determining if this is the deepest level of recursion, if not, determining if a selected data-structure total is greater than zero, and if not going to step f;

i. if the selected data-structure total at step h is greater than zero, generating object space coordinates corresponding to the selected image space data structure;

j. determining if the next recursion level is complete, if not recursing and going to step f, and if yes setting a parent data element total equal to a previous parent data element total minus a total returned from a next recursion level, and going to step f;

k. if at step h this is determined to be the deepest level of recursion, marking a primitive data-structure element as used;

l. determining if the selected data-structure total is greater than zero, if not, going to step f;

m. if yes, generating object space coordinates corresponding to current data element's image space coordinates;

n. determining if the object space array voxel value is within the isocontour, if not, going to step f;

o. determining if eight image voxel coordinates have been generated, and if not, generating the next (of eight) image space voxel coordinate values in front-to-back order;

p. determining if the image space coordinates are coplanar or behind the cutting plane, and if not, going to step o;

q. if yes, determining if a screen space location (given by X', Y') are unwritten, and if not, going to step o;

r. if yes, copying the voxel value from object space to a screen space array;

s. marking screen space location as used;

t. decrementing a primitive data-structure total by one, and going to step o;

u. at step f, if all data structures have been examined, determining if a current data-structure total is greater than zero;

v. if yes, projecting into unchecked image space data-structure leaf elements at current and deeper data-structure levels until total is zero or all these data structures are examined;

w. returning total screen space pixels lit by end of recursion, and going to step j;

x. if at step u the current data element total is not greater than zero, going to step w.

13. Apparatus controlled by a user for extracting isocontours within a three-dimensional volume using a computer with a plurality of units with instructions and data for each unit, comprising means for first partitioning the volume among the units, means permitting the user to indicate an isocontour to be extracted and for inserting a cutting plane into the image space volume, and in response thereto rendering a two-dimensional version of a volume;

a. means for producing a means for characterizing the input data set of a set in object space $\{N_O\}$ as a data volume is loaded at each unit;

b. means effective after the data set is fully loaded, for using the data set characterization to calculate a percentage of voxels in the object space set $\{N_O\}$ having each density value;

c. for each set of user inputs, means for having each unit independently determine if its image space set $\{N_I\}$ lies in front of a cutting plane using the cutting plane intersection and back-to-front reference plane distance tests in an adaptive back-to-front volume rendering procedure;

d. for each processor lying in front of the cutting plane, means for performing no computations;

e. means effective if a processor is fully behind the cutting plane, for using an adaptive front-to-back-procedure by the unit to generate its image space output;

f. means effective if the cutting plane interests a processor's image space set $\{N_I\}$, for having the unit compute an expected threshold saturation $\sigma_e$ from the data set characterization and for using this figure to calculate a cutover point X;

g. means effective if the cutting plane lies behind the cutover point X, for then using the adaptive back-to-front procedure, otherwise using the adaptive front-to-back procedure.

14. Apparatus controlled by a user for showing from an arbitrary orientation with an arbitrarily positioned cutting plane the extracted isocontours and rendering of a display of a three dimensional volume using a multiple-instruction, multiple-data (MIMD) computer having a plurality of processors, comprising means for first partitioning in the volume among the processors, means permitting the user to indicate an isocontour to be extracted and for inserting a cutting plane into an image space volume, and in response thereto rendering a two-dimensional version of a volume;

comprising means for first partitioning the volume among the units, means permitting the user to indicate an isocontour to be extracted and for inserting a cutting plane into a image space volume, and in response thereto rendering a two-dimensional version of a volume;

a. means for producing a histogram of a set in object space $\{N_O\}$ as a data volume is loaded at each unit;

b. means effective after the data set is fully loaded, for using the histogram data to calculate a percentage of voxels in the object space set $\{N_O\}$ having each density value;

c. for each set of user inputs, means for having each unit independently determine if its image space set $\{N_I\}$ lies in front of a cutting plane using the cutting plane intersection and back-to-front reference plane distance tests in an adaptive back-to-front hidden-surface removal procedure;

d. for each processor lying in front of the cutting plane, means for performing no computations;

e. means effective if a processor is fully behind the cutting plane, for using an adaptive front-to-back-procedure by the unit to generate its image space output;

f. means effective if the cutting plane interests a processor's image space set $\{N_I\}$, for having the unit compute an expected threshold saturation $\sigma_e$ by summing the histogram percentages and for using this figure to calculate a cutover point X;

g. means effective if the cutting plane lies behind the cutover point X, for then using the adaptive back-to-front procedure, otherwise using the adaptive front-to-back procedure.

* * * * *

UNITED STATES PATENT AND TRADEMARK OFFICE
CERTIFICATE OF CORRECTION

PATENT NO. : 5,201,035
DATED      : April 6, 1993
INVENTOR(S): Martin R. Stytz et al It is certified that error appears in the above-identified patent and that said Letters Patent is hereby corrected as shown below:

Column 1, line 30, "Tuv" should be -- Tuy --.
Column 6, line 42, "Projected" should not be capitalized.
Column 7, line 37, a period should follow "ignored".
Column 7, line 65, ">" should be -- » --.
Column 7, line 66, ">" should be -- » --.

Column 44, line 58, "one" should be -- node --.

Signed and Sealed this

First Day of February, 1994

Attest:

BRUCE LEHMAN

*Attesting Officer*    Commissioner of Patents and Trademarks